United States Patent
Oda et al.

(10) Patent No.: US 11,337,486 B2
(45) Date of Patent: May 24, 2022

(54) ORTHODONTIC APPLIANCE INCLUDING ARCH MEMBER

(71) Applicant: 3M INNOVATIVE PROPERTIES COMPANY, St. Paul, MN (US)

(72) Inventors: Todd I. Oda, Torrance, CA (US); Lee C. Yick, Placentia, CA (US); David K. Cinader, Jr., Woodbury, MN (US); Richard E. Raby, Lino Lakes, MN (US); Ralf M. Paehl, Melle (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 816 days.

(21) Appl. No.: 15/552,599

(22) PCT Filed: Mar. 9, 2016

(86) PCT No.: PCT/US2016/021588
§ 371 (c)(1),
(2) Date: Aug. 22, 2017

(87) PCT Pub. No.: WO2016/149008
PCT Pub. Date: Sep. 22, 2016

(65) Prior Publication Data
US 2018/0338564 A1    Nov. 29, 2018

Related U.S. Application Data

(60) Provisional application No. 62/133,142, filed on Mar. 13, 2015.

(51) Int. Cl.
*A43B 7/14* (2022.01)
*A61C 7/00* (2006.01)
(Continued)

(52) U.S. Cl.
CPC ............ *A43B 7/14* (2013.01); *A43D 11/01* (2013.01); *A61C 7/002* (2013.01); *A61C 7/20* (2013.01);
(Continued)

(58) Field of Classification Search
CPC ............ A61C 7/002; A61C 7/20; A61C 7/12
See application file for complete search history.

(56) References Cited

U.S. PATENT DOCUMENTS 3,505,736 A * 4/1970 Brader ............... A61C 7/12
433/20
3,593,421 A  7/1971 Brader
(Continued)

FOREIGN PATENT DOCUMENTS

CN   203354666   12/2013
CN   103565533   2/2014
(Continued)

OTHER PUBLICATIONS

Machine translation of DE-102015009345-A1 (Year: 2016).*
(Continued)

*Primary Examiner* — Jacob J Cigna
*Assistant Examiner* — Michael W Hotchkiss
(74) *Attorney, Agent, or Firm* — 3M IPC

(57) ABSTRACT

A method of forming an arch member comprising an arch member body and an arch member coupling integral with the body, comprising: providing a substrate comprising a resilient material; and removing a portion of the substrate to form the arch member. The arch member body including a cross-sectional geometry that varies along a length of the body. Also a method of designing an orthodontic appliance comprising: providing a proposed specification of the orthodontic appliance, wherein the orthodontic appliance comprises an arch member comprising an arch member body and (Continued)

US 11,337,486 B2

Page 2 an arch member coupling integral with the body, and a set of anchors, providing a first digital image representing a first dental arrangement associated with the orthodontic appliance; deriving a target digital image representing a target dental arrangement; revising the proposed specification of the orthodontic appliance based in part on the target digital image; and forming the orthodontic appliance based on the revised proposed specification.

10 Claims, 8 Drawing Sheets

(51) Int. Cl.
- A61C 7/20 (2006.01)
- A61C 7/28 (2006.01)
- A61C 7/30 (2006.01)
- A43D 11/01 (2006.01)
- A61C 7/12 (2006.01)

(52) U.S. Cl.
CPC ............... *A61C 7/28* (2013.01); *A61C 7/30* (2013.01); *A61C 7/12* (2013.01)

(56) References Cited

U.S. PATENT DOCUMENTS

| | | | |
|---|---|---|---|
| 3,762,050 A | 10/1973 | Dal Pont | |
| 4,892,479 A * | 1/1990 | McKenna | A61C 7/20 433/20 |
| 5,092,768 A | 3/1992 | Korn | |
| 5,184,955 A * | 2/1993 | Baer | A61C 5/007 433/215 |
| 5,259,760 A | 11/1993 | Orikasa | |
| 6,095,809 A | 8/2000 | Kelly | |
| 6,168,429 B1 * | 1/2001 | Brown | A61C 7/287 433/11 |
| 6,183,250 B1 | 2/2001 | Kanno | |
| 6,190,166 B1 | 2/2001 | Sasakura | |
| 6,227,851 B1 | 5/2001 | Chishti | |
| 6,264,468 B1 * | 7/2001 | Takemoto | A61C 7/12 433/10 |
| 6,302,688 B1 | 10/2001 | Jordan | |
| 6,394,801 B2 | 5/2002 | Chishti | |
| 6,582,226 B2 | 6/2003 | Jordan | |
| 6,616,444 B2 | 9/2003 | Andreiko | |
| 6,705,863 B2 | 3/2004 | Phan | |
| 6,739,870 B2 | 5/2004 | Lai | |
| 6,776,614 B2 | 8/2004 | Wiechmann | |
| 6,830,450 B2 | 12/2004 | Knopp | |
| 7,014,460 B2 | 3/2006 | Lai | |
| 7,020,963 B2 | 4/2006 | Cleary | |
| 7,121,825 B2 | 10/2006 | Chishti | |
| 7,252,505 B2 | 8/2007 | Lai | |
| 7,291,011 B2 | 11/2007 | Stark | |
| 7,306,458 B1 * | 12/2007 | Lu | A61C 7/14 433/16 |
| 7,354,268 B2 | 4/2008 | Raby | |
| 7,367,800 B2 | 5/2008 | Lai | |
| 7,404,714 B2 | 7/2008 | Cleary | |
| 7,726,968 B2 | 6/2010 | Raby | |
| 7,771,195 B2 | 8/2010 | Knopp | |
| 7,811,087 B2 | 10/2010 | Wiechmann | |
| 7,841,858 B2 | 11/2010 | Knopp | |
| 7,850,451 B2 | 12/2010 | Wiechmann | |
| 7,869,983 B2 | 1/2011 | Raby | |
| 7,901,207 B2 | 3/2011 | Knopp | |
| 7,909,602 B1 | 3/2011 | Highland | |
| 7,993,133 B2 | 8/2011 | Cinader, Jr | |
| 8,194,067 B2 | 6/2012 | Raby | |
| 8,292,617 B2 | 10/2012 | Brandt | |
| 8,356,993 B1 | 1/2013 | Marston | |
| 8,371,847 B2 | 2/2013 | Baron | |
| 8,535,580 B2 | 9/2013 | Puttler | |
| 8,827,697 B2 | 9/2014 | Cinader, Jr. | |
| 9,254,182 B2 * | 2/2016 | Curley | A61C 7/287 |
| 10,136,966 B2 * | 11/2018 | Reybrouck | A61C 7/12 |
| 10,278,791 B2 * | 5/2019 | Schumacher | A61C 5/007 |
| 10,383,707 B2 * | 8/2019 | Roein Peikar | A61C 7/12 |
| 2003/0124480 A1 * | 7/2003 | Peacock, III | A61C 7/18 433/23 |
| 2004/0029068 A1 * | 2/2004 | Sachdeva | A61C 9/0046 433/24 |
| 2004/0067463 A1 * | 4/2004 | Rosenberg | A61C 7/12 433/6 |
| 2005/0069833 A1 | 3/2005 | Chikami | |
| 2005/0181332 A1 * | 8/2005 | Sernetz | A61C 7/00 433/180 |
| 2005/0277083 A1 | 12/2005 | Lai | |
| 2005/0277084 A1 * | 12/2005 | Cinader | A61C 7/20 433/20 |
| 2006/0099545 A1 | 5/2006 | Lai | |
| 2006/0177791 A1 | 8/2006 | Cinader, Jr. | |
| 2007/0031774 A1 | 2/2007 | Cinader, Jr. | |
| 2007/0031791 A1 | 2/2007 | Cinader, Jr. | |
| 2007/0092849 A1 | 4/2007 | Cosse | |
| 2007/0154859 A1 | 7/2007 | Hilliard | |
| 2009/0113714 A1 | 5/2009 | Greenberg | |
| 2009/0233252 A1 | 9/2009 | Cinader, Jr. | |
| 2010/0260405 A1 | 10/2010 | Cinader, Jr. | |
| 2010/0275668 A1 * | 11/2010 | Riemeier | A61C 7/20 72/293 |
| 2010/0304321 A1 * | 12/2010 | Patel | A61C 7/20 433/9 |
| 2011/0086322 A1 * | 4/2011 | Baron | A61C 7/00 433/8 |
| 2011/0123944 A1 | 5/2011 | Knopp | |
| 2011/0136072 A1 | 6/2011 | Li | |
| 2011/0311935 A1 * | 12/2011 | Dumas | A61C 7/14 433/16 |
| 2012/0028208 A1 | 2/2012 | Cleary | |
| 2012/0048432 A1 | 3/2012 | Johnson | |
| 2012/0148972 A1 * | 6/2012 | Lewis | A61C 7/20 433/10 |
| 2012/0189971 A1 | 7/2012 | Kuo | |
| 2012/0270174 A1 * | 10/2012 | Meley | A61C 7/12 433/11 |
| 2012/0315595 A1 | 12/2012 | Beaudoin | |
| 2012/0322019 A1 * | 12/2012 | Lewis | A61C 7/20 433/10 |
| 2013/0029283 A1 | 1/2013 | Matty | |
| 2013/0095446 A1 | 4/2013 | Andreiko | |
| 2013/0196279 A1 * | 8/2013 | Curiel | A61C 7/002 433/3 |
| 2013/0209952 A1 | 8/2013 | Kuo | |
| 2013/0295515 A1 * | 11/2013 | Musich | A61C 7/20 433/18 |
| 2014/0120491 A1 * | 5/2014 | Khoshnevis | A61C 7/125 433/11 |
| 2014/0154637 A1 * | 6/2014 | Hansen | A61C 7/20 433/20 |
| 2014/0234794 A1 * | 8/2014 | Vu | A61C 7/002 433/20 |
| 2014/0255865 A1 * | 9/2014 | Gautam | A61C 7/28 433/9 |
| 2014/0272754 A1 * | 9/2014 | Curley | A61C 7/20 433/11 |
| 2014/0272757 A1 * | 9/2014 | Chishti | A61C 7/125 433/18 |
| 2014/0302448 A1 * | 10/2014 | Cassalia | A61C 7/28 433/9 |
| 2015/0086936 A1 * | 3/2015 | Owen | A61C 7/00 433/10 |
| 2016/0058527 A1 * | 3/2016 | Schumacher | A61C 5/007 433/6 |
| 2016/0262850 A1 | 9/2016 | Huang | |
| 2017/0105817 A1 * | 4/2017 | Chun | A61C 7/12 |

(56) References Cited

U.S. PATENT DOCUMENTS

| | | | |
|---|---|---|---|
| 2018/0049847 A1* | 2/2018 | Oda | A61C 7/002 |
| 2019/0254780 A1* | 8/2019 | Brandt | A61C 7/002 |

FOREIGN PATENT DOCUMENTS

| | | | |
|---|---|---|---|
| CN | 204092225 | 1/2015 | |
| DE | 102015009345 A1 * | 1/2016 | A61C 7/10 |
| DE | 102015009345 B4 * | 3/2019 | A61C 7/10 |
| EP | 1405610 | 4/2004 | |
| FR | 2972342 | 9/2012 | |
| KR | 20090043376 | 5/2009 | |
| WO | WO 2007/084727 | 7/2007 | |
| WO | WO 2007/087697 | 8/2007 | |
| WO | WO 2014/028582 | 2/2014 | |
| WO | WO 2015/032918 | 3/2015 | |
| WO | WO 2016/109660 | 7/2016 | |
| WO | WO 2016/148960 | 9/2016 | |
| WO | WO 2016/148961 | 9/2016 | |

OTHER PUBLICATIONS

DE-102015009345-B4 machine translation (Year: 2019).*
3M™ ESPE™ MDI Mini Dental Implants Technical Data Sheet, 2012.
International Search report for PCT International Application No. PCT/US2016/021583 dated Jun. 9, 2016, 2016, 5 pages.
International Search report for PCT International Application No. PCT/US2016/021588 dated Oct. 5, 2016, 2016, 8 pages.

* cited by examiner

ORTHODONTIC APPLIANCE INCLUDING ARCH MEMBER

CROSS REFERENCE TO RELATED APPLICATIONS

This application is a national stage filing under 35 U.S.C. 371 of PCT/US2016/021588, filed Mar. 9, 2016, which claims the benefit of U.S. Provisional Application No. 62/133,142, filed Mar. 13, 2015, the disclosures of which are incorporated by reference in their entireties herein.

BACKGROUND

Orthodontics is the area and specialty of dentistry associated with the supervision, guidance, and correction of malpositioned teeth into proper locations. Orthodontic treatment can be useful in correcting defects in a patient's bite (also called occlusion) along with promoting better hygiene and improving the overall aesthetics and health of the teeth.

Orthodontic treatment often involves the use of slotted appliances known as brackets, which are generally affixed to the patient's anterior, cuspid, and bicuspid teeth. After the brackets have been placed on the teeth, an archwire is received into a slot of each bracket. The archwire can act as a track to guide the movement of respective teeth to orthodontically correct positions. End sections of the archwire are typically captured in appliances known as buccal tubes that are affixed to the patient's molar teeth. The brackets, archwires, and buccal tubes are typically referred to collectively as "braces."

Conventional braces, however, have inherent limitations. For example, brackets and wires in the mouth tend to trap food and plaque, especially in areas behind the archwire and beneath bracket tiewings. The poor oral hygiene that results from plaque build-up, in turn can lead to additional problems, including tooth decay, gingivitis, periodontal disease, etc. Plaque build-up adjacent the brackets in particular can also cause decalcification and so-called "white spot" lesions on enamel surfaces of teeth that remain even after the braces are removed at the conclusion of treatment.

Removable appliances can significantly alleviate some of these problems because the appliances can be removed from the mouth while eating and/or brushing. Not only do removable appliances facilitate the maintenance and cleaning of the teeth, they also facilitate cleaning of the appliance. Popular removable appliances include polymeric aligner shells manufactured by Align Technology (Santa Clara, Calif.), which are intended to incrementally and progressively re-position teeth to a desired teeth arrangement. Other types include wire-embedded appliances such as those based on the Hawley retainer or Crozat appliance, which typically use metal wires that passively contact the teeth surfaces. While these appliances can be used to provide corrective tooth movements, they are most commonly used for retention of teeth after correction has been completed. Spring aligners, also called spring retainers, which combine aspects of both clear aligners and wire-embedded retainers, can also be used for orthodontic correction. These aligners, however, are limited in the types of forces they can apply to teeth, which in turn can limit the breadth of dental malocclusions that can be treated.

SUMMARY

In general, the present disclosure provides various embodiments of an orthodontic appliance and methods of forming such appliance. In one or more embodiments, the appliance can include one or more anchors and an arch member. Each anchor can include an anchor coupling and a base adapted to connect the anchor to a surface of a tooth. Further, the arch member can include an arch member body and one or more arch member couplings integral with the body. In one or more embodiments, the body of the arch member can include a cross-sectional geometry that varies along a length of the body. The arch member coupling can be releasably connectable to the anchor coupling.

In one aspect, the present disclosure provides an orthodontic appliance that includes a first anchor including an anchor coupling and a base adapted to connect the first anchor to a surface of a first tooth, and a second anchor including an anchor coupling and a base adapted to connect the second anchor to a surface of a second tooth. The appliance also includes an arch member including an arch member body and first and second arch member couplings integral with the body, the arch member body including a cross-sectional geometry that varies along a length of the body. The first arch member coupling is releasably connectable to the anchor coupling of the first anchor and the second arch member coupling is releasably connectable to the anchor coupling of the second anchor. The arch member body includes a first nonlinear portion between the first arch member coupling and the second arch member coupling that is adapted to be spaced apart from the surfaces of the first and second teeth when the first and second anchors are connected to the surfaces of the first and second teeth and the first and second arch member couplings are releasably connected to the anchor couplings of the first and second anchors.

In another aspect, the present disclosure provides an orthodontic appliance that includes an arch member including an arch member body and a plurality of arch member couplings integral with the body, and a plurality of anchors each including an anchor coupling and a base adapted to connect the anchor to a surface of a tooth. Each arch member coupling is releasably connectable to the anchor coupling of an anchor of the plurality of anchors. Further, a first portion of the arch member body is adapted to provide a first corrective force and a second portion of the arch member body is adapted to provide a second corrective force different from the first corrective force. The arch member body is adapted to not contact the surface of the tooth when the anchor of the plurality of anchors is connected to the surface of the tooth.

In another aspect, the present disclosure provides a method of forming an arch member that includes an arch member body and an arch member coupling integral with the body. The method includes providing a substrate including a resilient material, and removing a portion of the substrate to form the arch member.

In another aspect, the present disclosure provides a method of specifying an orthodontic appliance. The method includes providing a proposed specification of the orthodontic appliance, where the orthodontic appliance includes an arch member including an arch member body and an arch member coupling integral with the body. The appliance also includes a set of anchors, each anchor including an anchor coupling and a base adapted to connect the anchor to a surface of a tooth Each arch member coupling is releasably connectable to an anchor coupling. Further, the arch member body includes a cross-sectional geometry that varies along a length of the body. The method further includes providing a first digital image representing a first dental arrangement associated with the orthodontic appliance, deriving a target digital image representing a target dental arrangement, revising the proposed specification of the orthodontic appliance based in part on the target digital image, and forming the orthodontic appliance based on the revised proposed specification.

In another aspect, the present disclosure provides an orthodontic treatment system that includes an orthodontic appliance. The orthodontic appliance includes a set of arch members, each arch member including an arch member body and an arch member coupling integral with the body. At least one arch member of the set of arch members includes an arch member body including a cross-sectional geometry that varies along a length of the body. The appliance also includes a set of anchors adapted to connect to respective teeth of a patient's dental arch, each anchor including an anchor coupling and a base adapted to connect the anchor to a surface of a tooth. The arch member coupling is releasably connectable to an anchor coupling of an anchor of the set of anchors. Further, a first arch member of the set of arch members has a first cross-sectional geometry adapted to move at least one tooth from a first arrangement to a second arrangement, and a second arch member of the set of arch members has a second cross-sectional geometry adapted to move at least one tooth from the second arrangement to a third arrangement.

All headings provided herein are for the convenience of the reader and should not be used to limit the meaning of any text that follows the heading, unless so specified.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements.

The words "preferred" and "preferably" refer to embodiments of the disclosure that may afford certain benefits, under certain circumstances; however, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The use of the term "and/or" in certain portions of this disclosure is not intended to mean that the use of "or" in other portions cannot mean "and/or."

The term "and/or" means one or all of the listed elements or a combination of any two or more of the listed elements.

As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

Glossary

The terms set forth herein will have the meanings as defined:

"adapted for displacement" means that an anchor of an orthodontic appliance is designed such that it is able to move relative to an arch member body that is connected to the anchor. The movement of the anchor relative to the arch member body can be translational, rotational, and a combination of translational and rotational movement. Further, the movement of the anchor relative to the arch member body can be in any plane and along any desired path;

"angulation" means the tilt of the long axis of the tooth in a mesial or distal direction;

"cross-sectional geometry" means a cross-sectional shape of an arch member body taken in a plane orthogonal to a length of the arch member body;

"corrective force" means a force or forces applied to one or more of a patient's teeth by an orthodontic appliance;

"distal" means in a direction away from the center of the patient's curved dental arch;

"facial" means in a direction toward the patient's lips or cheeks;

"gingival" means in a direction toward the patient's gums or gingiva;

"inclination" means the tilt of the long axis of a tooth in the buccolingual or faciolingual direction;

"lingual" means in a direction toward the patient's tongue;

"mesial" means in a direction toward the center of the patient's curved dental arch;

"occlusal" means in a direction toward the outer tips of the patient's teeth;

"releasably connectable" means that an arch member coupling can be connected to an anchor coupling of an anchor such that an arch member connected to the arch member coupling remains attached to the anchor and that the arch member coupling can be disconnected from the anchor coupling using an appropriate amount of force without destroying or altering the anchor coupling;

"rotation" means turning of a tooth by movement around its long axis;

"self ligating" means that an arch member can be connected to one or more anchors that are connected to surfaces of one or more teeth without the need for use of additional ties, wires, clamps, or other devices that fix the arch member in place; and "torque" means a corrective force that changes the inclination of the tooth.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION

Figure 1:
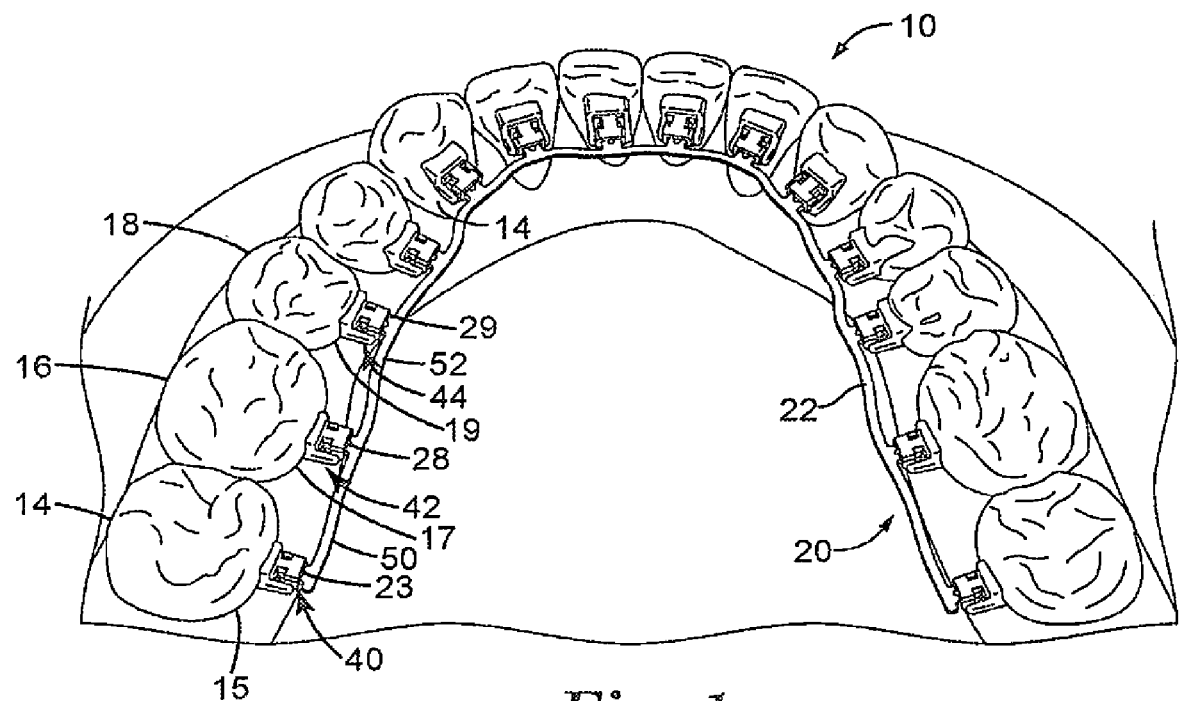
FIG. 1 is a schematic perspective view of one embodiment of an orthodontic appliance connected to surfaces of one or more teeth of a patient.
Figure 2:
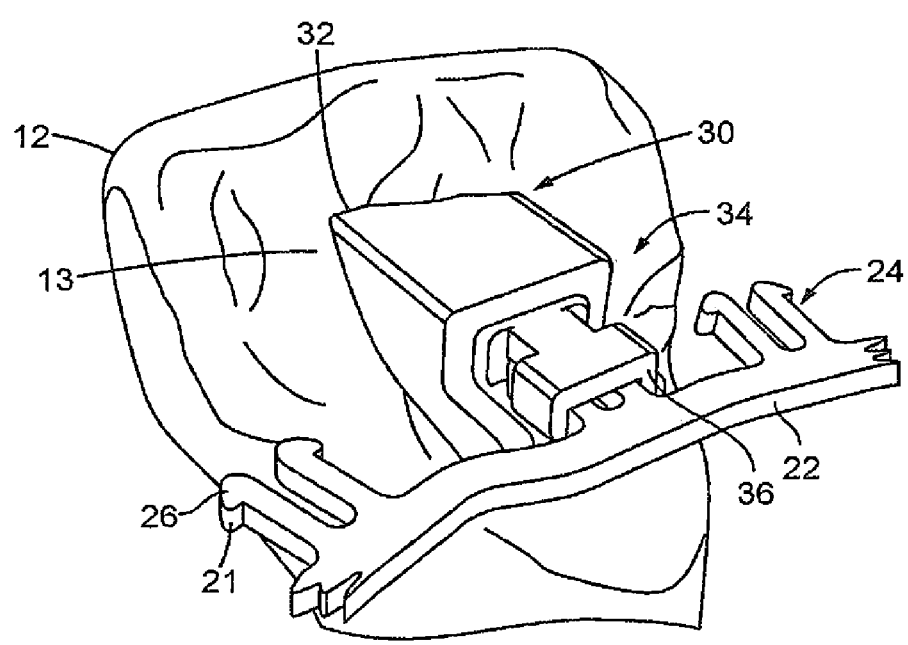
FIG. 2 is a schematic perspective view of a portion of the orthodontic appliance of FIG. 1.
Figure 3:
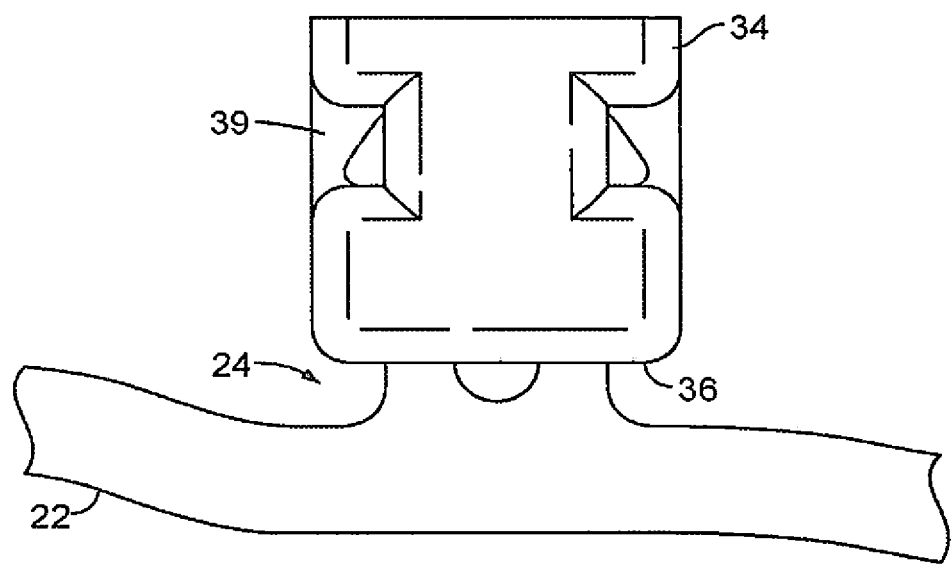
FIG. 3 is a schematic plan view of a portion of the orthodontic appliance of FIG. 1.

In general, the present disclosure provides various embodiments of an orthodontic appliance and a method of forming such appliance. In one or more embodiments, the appliance can include one or more anchors and an arch member. Each anchor can include an anchor coupling and a base adapted to connect the anchor to a surface of a tooth. Further, the arch member can include an arch member body and one or more arch member couplings integral with the body. In one or more embodiments, the body of the arch member can include a cross-sectional geometry that varies along a length of the body. The arch member coupling can be releasably connectable to the anchor coupling.

Orthodontic systems typically rely on straightening teeth by attaching a stressed archwire to an orthodontic bracket. The teeth move and unravel to the final or relaxed shape of the archwire. A typical orthodontic appliance includes an orthodontic archwire that slides within a lumen or slot of an orthodontic bracket as the teeth straighten. The movement of the archwire relative to the orthodontic bracket can be referred to as the sliding mechanics of the appliance. Passive brackets allow the archwire to move freely within the slot regardless of the archwire size. This can allow faster tooth movement during the initial stages of treatment because of the reduced friction between the archwire and the bracket but may cause difficulties during the finishing stages of treatment. Active brackets tend to force the archwire to the bottom of the archwire slot to increase bracket control. This increase in bracket control allows the practitioner to more easily align the teeth during the finishing stages of treatment. Active brackets, however, can increase the amount of friction between the archwire and the bracket, thereby impairing the sliding mechanics of die orthodontic system.

One or more embodiments of orthodontic appliances described herein can include an arch member having one or more arch member couplings that releasably couple to anchor couplings of one or more anchors such that the arch member does not move relative to the anchor. The arch member can include an arch member body that is formed into one or more geometries that can emulate the sliding mechanics of a conventional orthodontic system. In one or more embodiments, the various geometries can dictate a path that does not follow sliding mechanics. Because the arch member body does not move relative to the anchor, the anchor can, in one or more embodiments, be made substantially simpler and smaller. This can be especially advantageous when the orthodontic appliance is connected to a lingual surface of one or more teeth as the space in this lingual orientation for placing an orthodontic appliance is somewhat limited. Further, because the arch member body does not move relative to the anchor, no friction exists between the arch member body and the anchor. This lack of friction between the arch member and the anchors may, in one or more embodiments, allow the teeth to unravel and straighten within a shorter period of time.

Current removable appliances, while offering certain hygiene benefits, can also have shortcomings related to treatment efficacy. Polymeric shells, for example, tend to be limited in their ability to correct particular dental malocclusions. Further, extrusion, gap closure, and molar tooth movement can be difficult or impossible to achieve because these shells rely on relatively weak mechanical retention between the shell and the teeth. Further, polymeric shells may not be entirely aesthetic even when clear since they still cover the facial teeth surfaces and can stain or trap dark liquids such as coffee. On the other hand, retainer-like appliances that use springs or clasps that engage with teeth suffer from many of the same shortcomings as polymeric shells. These appliances, as a whole, may not positively engage with the teeth in a manner that allows precise torque, angulation, rotation, and translation control. Further, many of these appliances are generally not aesthetic as they use a facial wire residing over the facial surface of the teeth to prevent proclination of the teeth.

One or more embodiments of orthodontic appliances described herein can be easily installed and removed by a practitioner as the appliance is self-ligating, i.e., an arch member of the appliance can be connected to one or more anchors that are connected to surfaces of one or more teeth without the need for use of additional ties, wires, clamps, or other devices that fix the arch member in place. In one or more embodiments where the appliance is adapted to be connected to a lingual surface of one or more teeth of a patient, the appliance can be more aesthetically pleasing than clear aligners as the appliance is at least partially hidden from view by the patient's teeth.

FIGS. 1-4 are various schematic views of one embodiment of an orthodontic appliance 10. The appliance 10 is shown in FIG. 1 connected to one or more teeth 12 of a patient. The appliance 10 can include one or more anchors 30, where one or more anchors includes an anchor coupling 34 and a base 32 adapted to connect the anchor to a surface 13 of a tooth 12. The appliance 10 can also include an arch member 20 that includes an arch member body 22 and one or more arch member couplings 24 connected to the arch member body. As is further described herein, the arch member coupling 24 can be releasably connectable to the anchor coupling 34.

The orthodontic appliance 10 can also include one or more anchors 30. At least one anchor 30 can include an anchor coupling 34 and a base 32 adapted to connect the anchor to a surface 13 of a tooth 12. For example, the appliance 10 can include a first anchor 40, a second anchor 42, and a third anchor 44. The first anchor 40 can include an anchor coupling 34 and a base 32 adapted to connect the respective anchor to a surface 15 of a first tooth 14. The second anchor 42 can include an anchor coupling 34 and a base 32 adapted to connect the second anchor to a surface 17 of a second tooth 16. And the third anchor 44 can include an anchor coupling 34 and a base 32 adapted to connect the third anchor to a surface 19 of a third tooth 18. Further, the arch member 20 can include a first arch member coupling 23, a second arch member coupling 28, and a third arch member coupling 29. The first arch member coupling 23 can be releasably connectable to the anchor coupling 34 of the first anchor 40, the second arch member coupling 28 can be releasably connectable to the anchor coupling 34 of the second anchor 42, and the third arch member coupling 29 can be releasably connectable to the anchor coupling 34 of the third anchor 44.

The anchor coupling 34 can take any suitable shape or combination of shapes. For example, the anchor coupling 34 can include a slot 36 that is adapted to receive one or more tabs 26 of arch member coupling 24. The slot 36 can include one or more openings 39 that are adapted to receive barb 21 of tab 26 such that the tab is releasably connected to the slot 36. To remove the arch member coupling 24 from the anchor coupling 34, the practitioner can bring together the tabs 26 such that the barb 21 is no longer engaged with opening 39 of slot 36.

The anchor 30 can include any suitable material or combination of materials. For example, the anchor 30 can include metallic material, polymeric material, glass material, and combinations thereof. In one or more embodiments, the anchor 30 can include the same materials as described for the arch member body 22. The anchor 30 can also take any suitable shape or combination of shapes such that the base is adapted to connect the anchor to a surface of a tooth and releasably connect the anchor to arch member coupling 24.

The base 32 of the anchor 30 can have a tooth facing surface contour that is customized to fit any suitable surface of a tooth 12. For example, in one or more embodiments, the base 32 has a tooth-facing surface contour that is customized to fit a lingual surface 13 of the tooth 12. Having a customized base 32 can allow the anchor 30 to be configured with a lower profile for patient comfort. In one or more embodiments, the base 32 of the anchor 30 can be customized such that it provides a self-positioning "lock and key" mechanism, where the base has contours that only allow anchor 30 to be mounted on the teeth 12 in a unique, well-defined location and orientation. Any suitable technique or combination of techniques can be utilized to form customized bondable anchors, e.g., the techniques described in U.S. Pat. No. 6,776,614 (Wiechmann et al.), U.S. Pat. No. 7,811,087 (Wiechmann et al.), and U.S. Pat. No. 7,850,451 (Wiechmann et al.), and U.S. Patent Publication No. 2005/0277084 (Cinader et al.). In one or more embodiments, the base 32 of one or more anchors 30 can include any suitably shaped surface that is not necessarily customized to fit a particular surface of a tooth, i.e., a "generic" base.

The anchor 30 can be attached to the surface 13 of tooth 12 using any suitable technique or combination of techniques. For example, the anchor 30 can be bonded to the surface 13 of tooth 12 using a suitable adhesive or cement. The anchor 30 need not be adhesively bonded. For example, one or more anchors 30 may be welded to an orthodontic band and the band subsequently secured to a respective tooth 12 using a suitable band cement. In one or more embodiments, anchors 30 are bondable lingual buttons or other commercially available off-the-shelf bondable appliances. Further, anchors 30 may be formed entirely from a curable composite dental material, such as TRANSBOND brand light cure adhesive (available from 3M Company, St. Paul, Minn.), and cured in vivo on the patient's teeth using techniques such as those described in U.S. Patent Application Publication No. 2007/0031774 (Cinader et al.).

Connected to one or more anchors is the arch member 20. In one or more embodiments, the arch member can be a self-ligating arch member. The arch member includes the arch member body 22 and one or more arch member couplings 24 connected to the body. In one or more embodiments, the arch member couplings 24 can be integral with the body 22. The arch member 20 can include any suitable number of arch member couplings 24, e.g., 1, 2, 3, 4, 5 or more couplings. The arch member couplings 24 can be connected to the arch member body 22 using any suitable technique or combination of techniques. In one or more embodiments, the arch member couplings 24 can be attached to the arch member body 22 using any suitable technique or combination of techniques, e.g., welding, adhering using an adhesive, etc. In one or more embodiments, the arch member couplings 24 can be integrally formed with the arch member body 22 such that the arch member couplings are integral with the arch member body 22.

The arch member couplings 24 can include any suitable material or combination of materials. In one or more embodiments, the arch member couplings 24 can include the same material or combination of materials as those described for the arch member body 22. Each of the arch member couplings 24 can include the same material or combination of materials. In one or more embodiments, one or more arch member couplings 24 can include materials that are different from one or more additional arch member couplings 24.

The arch member couplings 24 can take any suitable shape or combination of shapes such that the arch member couplings are releasably connectable to one or more anchor couplings 34. Examples of releasable couplings are described, e.g., in issued U.S. Pat. No. 6,302,688 (Jordan et al.), U.S. Pat. No. 6,582,226 (Jordan et al.), U.S. Pat. No. 7,014,460 (Lai et al.), U.S. Pat. No. 7,252,505 (Lai), and U.S. Pat. No. 8,827,697 (Cinader et al.), and pending U.S. Patent Application Publication No. 2005/0277084 (Cinader et al). In one or more embodiments, the arch member coupling 24 and the anchor coupling 34 can each include a cross-sectional shape having two or more sides such that the appliance 10 can provide a force to correct angulation of one or more teeth. Although depicted as being connected to teeth via arch member couplings 24 and anchor couplings, in one or more embodiments, a portion of the arch member body 22 can be adapted to be attached directly to a surface 13 of a tooth 12 using any suitable technique or combination of techniques, e.g., direct bonding to the surface of the tooth.

The arch member couplings 24 and the anchor couplings 34 can be adapted such that the arch member body 22 and one or more anchors 30 are in a fixed relationship when the arch member coupling is connected to the anchor coupling of the anchor. In other words, when the anchor coupling 34 and the arch member coupling 24 are connected, the arch member body 22 adjacent the arch member coupling 24 is fixed and cannot move relative to the anchor in a direction parallel to the surface 13 of the attached tooth 12, i.e., the arch member body cannot slide relative to the anchor. In one or more embodiments, the anchor 30 can be adapted for displacement relative to the arch member body 22 when the anchor is connected to the tooth 12 and the arch member coupling 24 is releasably connected to the anchor coupling 24 of the anchor. As used herein, the phrase "adapted for displacement" means that the anchor 30 is designed such that it is able to move relative to the arch member body 22 that is connected to the anchor in a direction parallel to the surface 13 of the attached tooth 12. In one or more embodiments, the anchor 30 can move relative to the arch member body 22. In one or more embodiments, the arch member body can move relative to the anchor 30. In one or more embodiments, both the anchor 30 and the arch member body 22 can move relative to each other.

In the embodiment illustrated in FIGS. 1-4, the arch member coupling 24 includes one or more tabs 26 that are adapted to engage a slot 36 of anchor coupling 34. Each tab 26 can take any suitable shape or combination of shapes. In one or more embodiments, the tab 26 can be a resilient tab. Further, in one or more embodiments, one or more tabs 26 can include a barb 21 that is adapted to retain the tab in the slot 36 of the anchor coupling 34. In other words, the arch member coupling 24 can include a male coupling and the anchor coupling 34 can include a female coupling, or the arch member coupling can include a female coupling and the anchor coupling can include a male coupling. In one or more embodiments, one or more arch member couplings 24 can include male couplings that couple to one or more anchor couplings 34 that include female couplings, and one or more additional arch member couplings can include female couplings that couple to one or more additional anchor couplings that include male couplings.

The forces required to connect and disconnect couplings 24, 34 from each other can be sufficiently low to allow easy insertion and removal of the arch member 20 by the patient. In one or more embodiments, these forces can be sufficiently high such that the arch member 20 connects to the patient's dental structure and does not unintentionally detach from any of the anchors 30 during treatment. That is, couplings 24, 34 can remain connected even when subjected to normal corrective forces and other forces encountered during treatment. In one or more embodiments, couplings 24, 34 are adapted to yield an engagement force that is as low as possible. In one or more embodiments, the disengagement forces are neither too high such that disengagement causes patient discomfort nor too low such that spontaneous disengagement occurs during treatment. The optimal values for engagement and disengagement forces may vary considerably from tooth to tooth and depend in part on the configuration of the arch member body 22. In one or more embodiments, the forces required to disconnect couplings 24, 34 can be such that only a practitioner can remove the arch member 20.

The arch member 20 can provide a corrective force or forces to one or more teeth of a patient through the anchors 30 to provide an orthodontic treatment or series of treatments to the teeth of a patient. The arch member body 22 of the arch member 20 can include any suitable material or combination of materials that provide a wide range of material properties such as stiffness and resiliency. For example, the arch member body 22 can include metallic material, polymeric material, glass material, and combinations thereof. In one or more embodiments, the arch member body 22 can include at least one of nitinol, stainless steel, nickel titanium, and beta titanium. The arch member body 22 can be a unitary body or can include one or more layers of materials. Further, the arch member body 22 can be unitary along its length. In one or more embodiments, the arch member body 22 can include several portions that are connected together using any suitable technique or combination of techniques.

The arch member body 22 can also be individually configured based on the needs of the practitioner. For example, a given arch member body 22 can be made from stainless steel when a high level of corrective force is desired, nickel titanium for a lower level of force, and beta titanium for an intermediate level of force. In one or more embodiments, the body 22 can include other materials, including non-metallic materials such as polymers or filled composites. Furthermore, the cross-sectional geometry of the body 22 can be tailored to provide the desired corrective force or forces. For example, the shape and/or cross-sectional dimensions (e.g., thickness) of the body 22 can be tailored to provide the desired corrective force or forces. In one or more embodiments, the arch member body 22 can have a cross-sectional geometry that varies along a length of the body.

The arch member body 22 can include any suitable cross-sectional geometry, e.g., shape, area, orientation, etc. The cross-sectional geometry can be constant or vary along a length of the arch member body 22. For example, the arch member body 22 can take any suitable shape or combination of shapes. The arch member body 22 can also include any suitable cross-sectional shape, e.g., polygonal (e.g., triangular, rectangular, etc.), elliptical, etc. The cross-sectional shape of the arch member body 22 can be uniform along a length of the body. In one or more embodiments, a first portion of the arch member body 22 can have a first cross-sectional shape, and a second portion of the arch member body can have a second cross-sectional shape that is different from the first cross-sectional shape. The arch member body 22 can include a uniform cross-sectional area or a cross-sectional area that varies along the length of the body.

In one or more embodiments, the edges of the arch member body 22 can be smoothed after the body is formed to provide added comfort to a patient. Further, in one or more embodiments, one or more portions of the arch member body 22 can be coated with any suitable material or combination of materials to provide a coating that covers edges of the body to improve comfort. The arch member body 22 can also be covered with one or more protective covers that are applied to the body in portions between arch member couplings 24 such that the body does not have sharp corners. The covers can include any suitable material or combination of materials. In one or more embodiments, the covers can provide any desired aesthetic appearance. Further, the covers can include stain resistant material or materials to maintain the aesthetics of the covers.

Figure 4:
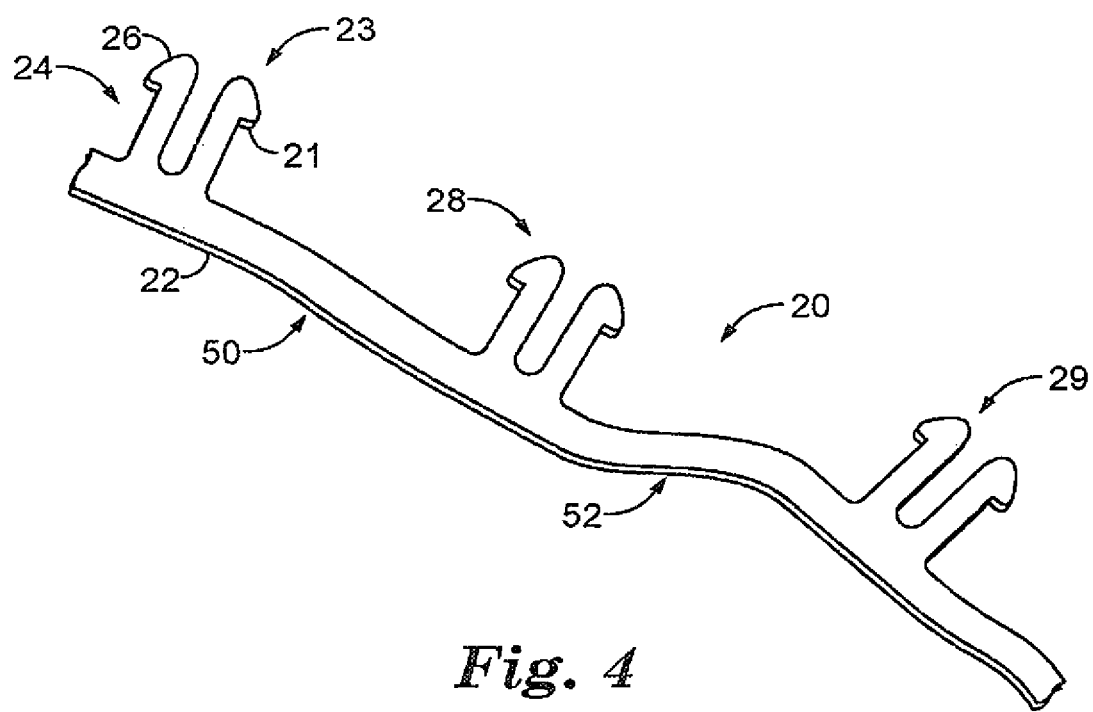
FIG. 4 is a schematic perspective view of a portion of an arch member of the appliance of FIG. 1.

The arch member body 22 can be adapted to provide any suitable corrective force between two or more arch member couplings 24. Any suitable technique or combination of techniques can be utilized to provide these corrective forces. For example, as shown in FIG. 4, a cross-sectional geometry (e.g., area) of the arch member body 22 can vary along a length of the body. For example, first portion 50 of arch member body 22, which is disposed between arch member coupling 23 and arch member coupling 28, has a first cross-sectional geometry. Arch member body 22 also includes a second portion 52, which is disposed between arch member coupling 28 and arch member coupling 29, that has a second cross-sectional geometry. In one or more embodiments, the first cross-sectional geometry in first portion 50 is different from the second cross-sectional geometry in second portion 52.

The cross-sectional geometry of the arch member body 22 can vary in any suitable plane or planes along the length of the body. In one or more embodiments, a thickness of the arch member body 22 can be varied to change the cross-sectional geometry of the body between any two anchor couplings 24 (a portion of that section of the body or continuously between). For example, in one or more embodiments, a thickness of the arch member body 22 can vary in a plane parallel to the mesio-distal direction and orthogonal to a surface of a tooth when the arch member 20 is connected to one or more teeth 12 of a patient via one or more anchors 30 as shown in FIG. 1. In one or more embodiments, a thickness of the arch member body 22 can vary in a plane orthogonal to the facial-lingual or occlusal-gingival directions along the mesial-distal length of the arch member and parallel to a surface of a tooth when the arch member 20 is connected to one or more teeth 12 of a patient via one or more anchors 30.

The cross-sectional geometry of the arch member body 22 can be selected to provide a desired bending stiffness in one or more portions of the arch member body. Tailoring the bending stiffness of the arch member body 22 can provide selected corrective forces that can be varied along a length of the arch member body. For example, in one or more embodiments, the second portion 52 of arch member body 22 can provide a smaller corrective force than the first portion 50 because the second portion has a cross-sectional area that is less than a cross-sectional area of the first portion 50. Although two portions 50, 52 of arch member body 22 are shown as having a varying cross-sectional geometry along the length of the body, any suitable portion or portions of the arch member body can have a varying cross-sectional geometry to provide one or more corrective forces between arch member couplings 24 of the arch member 20.

Figure 5:
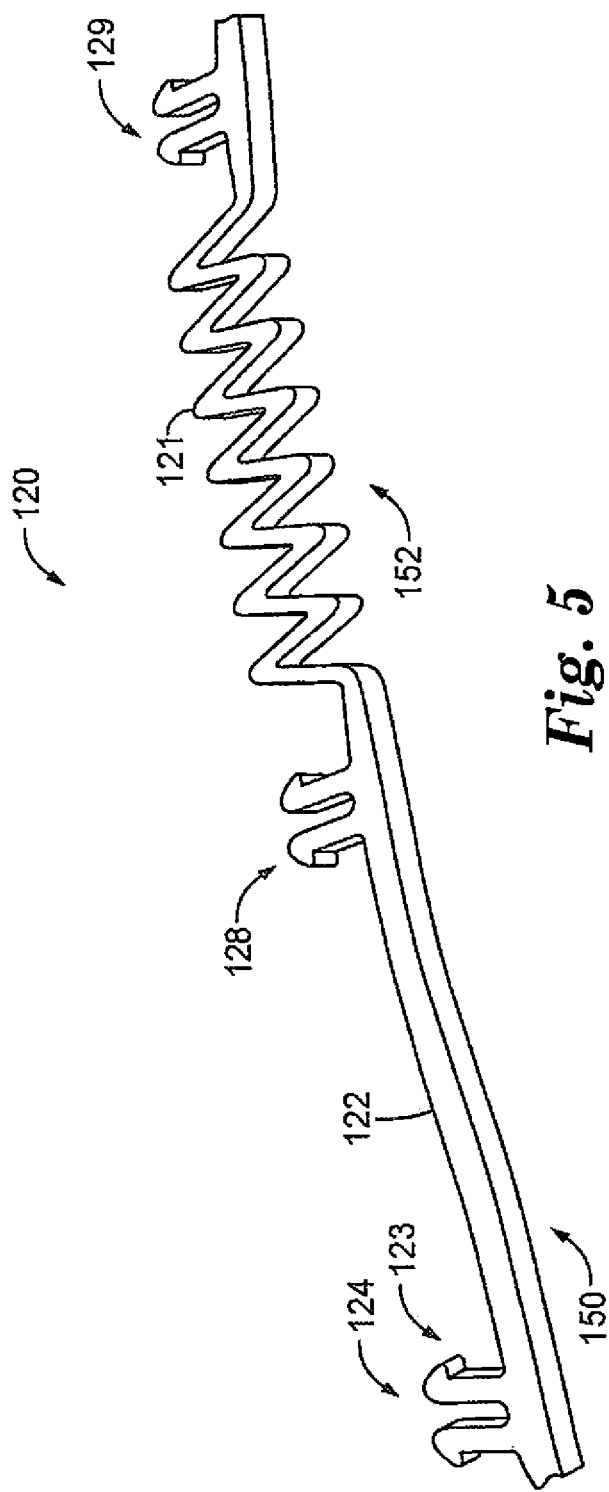
FIG. 5 is a schematic perspective view of a portion of another embodiment of an arch member.

Further, a shape of the arch member body 22 can be varied in any suitable plane to provide one or more corrective forces between arch member couplings of the arch member. The arch member body 22 can take any suitable shape or combination of shapes. For example, FIG. 5 is a schematic perspective view of a portion of another embodiment of an arch member 120. All of the design considerations and possibilities regarding arch member 20 of FIGS. 1-4 apply equally to arch member 120 of FIG. 5. Arch member 120 includes arch member body 122 and arch member couplings 124 connected to the arch member body. The arch member body 122 includes a first nonlinear portion 150 between arch member couplings 123 and 128. Further, arch member body 122 includes a second nonlinear portion 152 between arch member couplings 128 and 129. The first nonlinear portion 150 can take a first shape that is the same as a second shape of the second nonlinear portion 152. In one or more embodiments, the first shape can be different from the second shape. Any suitable shape or combination of shapes can be formed in the arch member body 122. In one or more embodiments, at least one of the first and second nonlinear portions 150, 152 can be, e.g., U-shaped, V-shaped, S-shaped, sinusoidal, etc. For example, the first nonlinear portion 150 can take a sinusoidal shape that extends in at least one of the gingival, occlusal, mesial, and distal directions when the arch member 120 is connected to one or more teeth via anchors (e.g., anchors 30 of FIGS. 1-4).

The first nonlinear portion 150 and the second nonlinear portion 152 can extend in any direction or combination of directions. For example, in one or more embodiments, at least one of the first nonlinear portion 150 and the second nonlinear portion 152 can extend in at least one of a gingival, occlusal, labial, and lingual direction when the first and second anchors (e.g., anchors 40, 42 of FIG. 1) are connected to the surfaces (e.g., surfaces 15, 17) of the first and second teeth (e.g., first and second teeth 14, 16) and the first arch member coupling 123 and the second arch member coupling 128 are connected to the anchor coupling of the first anchor and the anchor coupling of the second anchor respectively.

In one or more embodiments, the shape of the arch member body 122 can vary in a plane parallel to the mesio-distal direction and orthogonal to a surface of a tooth when die arch member 120 is connected to an anchor coupling of one or more anchors (not shown) that are connected to one or more teeth. In one or more embodiments, the shape of the arch member body 122 can vary in a plane orthogonal to the mesio-distal direction and parallel to a surface of the tooth. In one or more embodiments, the second nonlinear portion 152 can include an arcuate portion, e.g., a sinusoidal portion such as spring 121. Any suitable spring or combination of springs can be utilized. The spring 121 can be installed in a patient's mouth such that it is either in tension or compression to provide the desired corrective force.

In one or more embodiments, the first nonlinear portion 150 can have a first shape that is adapted to provide a first corrective force to one or both teeth connected to arch member couplings 123 and 128. Further, the second nonlinear portion 152 can have a second shape that is adapted to provide a second corrective force to one or both teeth that are attached to arch member couplings 128 and 129. The first corrective force can be the same as the second corrective force. In one or more embodiments, the first corrective force is different from the second corrective force.

One or more portions of the arch member body 122 can include both a varying cross-sectional geometry and a nonlinear shape or shapes. For example, second nonlinear portion 152 can also include a cross-sectional geometry that varies along the length of the portion, e.g., a thickness of the portion can vary along the spring 121.

Returning to FIGS. 1-4, one or more of the nonlinear portions, e.g., nonlinear portions 50, 52 can be adapted to be spaced apart from the surfaces 15, 17 of teeth that are connected to the appliance 10 by anchors 30. For example, as shown in FIG. 1, the first nonlinear portion 50 of the arch member body 22, which is between the first arch member coupling 23 and the second arch member coupling 28, can be adapted to be spaced apart from the surfaces 15, 17 of the first tooth 14 and the second tooth 16 when the first and second anchors 40, 42 are connected to the surfaces of the first and second teeth and the first and second arch member couplings 23, 28 are releasably connected to the anchor couplings of the first and second anchors 40, 42. The first nonlinear portion 50 can be spaced apart from the surfaces 15, 17 of the first and second teeth 14, 16 any suitable distance 2. The first nonlinear portion 50 can be spaced apart the same distance from each of the surfaces 15, 17 of the first and second teeth 14, 16. In one or more embodiments, the first nonlinear portion 50 can be spaced apart a distance from the surface 15 of the first tooth 14 that is different from the distance between the first nonlinear portion and the surface 17 of the second tooth 16. Any suitable number of portions of the arch member body 22 can be spaced apart from surfaces of the teeth to which the appliance 10 is connected. In one or more embodiments, the entire arch member body 22 is spaced apart from the connected surfaces of the teeth 12. In one or more embodiments, one or more portions of the arch member body 22 can be in contact with one or more teeth while one or more portions of the arch member body can be spaced apart from additional teeth.

One or both of the arch member 20 and the anchors 30 can include other devices or elements that can be utilized to provide a selected treatment to a patient. For example, in one or more embodiments, the selected shape of a nonlinear portion between two arch member couplings 24 can include at least one of a hook, a twist, a step, a loop, and a spring. For example, the arch member body 22 can include one or more flexible springs (e.g., spring 121 of FIG. 5) that allows longitudinal movement (i.e., in a direction generally along the length of the arch member body). The spring can be integral to the arch member body 22 or made separately from the body and connected to the body using any suitable technique or combination of techniques. The spring can also increase the flexibility of the arch member body 22. In one or more embodiments, the spring can be resilient and can deliver tensile or compressive forces in the longitudinal direction. Various types of springs may be used, including Z-springs, coil springs, omega loops, pushrods, or any combinations thereof. By increasing flexibility of the arch member body 22 and allowing longitudinal deflection, the springs can facilitate connecting the arch member couplings 24 and the anchor couplings 34 when the teeth are maloccluded. Based on the patient's treatment plan, the springs may be provided along any suitable portion or portions of the arch member body 22. The arch member 24 can include one or more tabs that can be adapted to engage at least one of the anchors 30 to maintain a connection between the arch member coupling 24 and the anchor coupling 34.

The arch member body 22 can be manufactured using any suitable technique or combination of techniques. In one or more embodiments, the arch member body 22 can be formed from a substrate, e.g., a sheet of material, by removing a portion or portions of the substrate. For example, a nitinol substrate can be cut or etched to form the arch member body 22. Any suitable technique or combination of techniques can be utilized to cut or etch the substrate, e.g., laser cutting, water jet cutting, etching (e.g., ion beam etching), die cutting, etc.

The arch member body 22 can be formed into any suitable shape or combination of shapes using any suitable technique or combinations of techniques. For example, the shape of the arch member body 22 can be formed when the arch member is cut or etched from a sheet of material. In one or more embodiments, the arch member body 22 can be formed and then shaped into one or more shapes using any suitable technique or combination of techniques, e.g., bending, machining, etc. The one or more shapes of the arch member body 22 can be set using any suitable technique or combination of techniques, e.g., heat setting.

As mentioned herein, the arch member body 22 can have any suitable cross-sectional geometry along the length of the body. In one or more embodiments, the arch member body 22 can have a thickness in an occlusal direction that varies along a length of the arch member body 22 when the arch member body is connected to one or more anchors 30 of the appliance 10. Varying the thickness of the arch member body 22 can provide control of corrective forces that are applied to one or more teeth. This thickness can be varied using any suitable technique or combination of techniques. In one or more embodiments, the thickness can be varied by removing portions of the arch member body 22 by ablating, etching, sanding, cutting, etc. The arch member body 22 can also be elongated in one or more portions to reduce the thickness in such portions.

In one or more embodiments, anchors 30 can be accurately placed and bonded in precise, pre-selected positions on the tooth surfaces of a patient (e.g., the lingual surfaces). To this end, it can be advantageous to use indirect techniques such as those described in U.S. Pat. No. 7,020,963 (Cleary et al.) and U.S. Pat. No. 7,404,714 (Cleary et al.), and U.S. Patent Publication No. 2006/0177791 (Cinader et al).

The appliance 10 can be capable of producing various types of tooth movement. The configuration of the arch member body 22 and the anchor couplings 34 of anchors 30, and the displacement of the arch member body (e.g., by deformation of the arch member body) relative to the anchor can allow appliance 10 to move teeth in ways that can be difficult to achieve using conventional aligners and wire-embedded appliances. Because one or more portions of the arch member body 22 can be formed into a variety of configurations, the appliance 10 has the potential to produce any combination of in-out and mesial-distal tooth movements, as well as tipping and rotational tooth movements. Translational tooth movements parallel to the longitudinal axis of the arch member body 22 can be performed by incorporating one or more flexible springs into the arch member body or by forming one or more springs in the arch member body.

The orthodontic appliance 10 can be manufactured using any suitable technique or combination of techniques. For example, in one or more embodiments, one or both of the arch member 20 and the anchor 30 can be manufactured using rapid manufacturing techniques. In one or more embodiments, the anchor coupling 34 and the arch member coupling 24 can be chosen from a standard library either by the manufacturer or a practitioner. Similarly, the arch member body 22 can be selected from a standard library and modified to meet the treatment targets of the practitioner. The tooth position targets for each stage of treatment can be suggested by software or by a technician and modified by the practitioner as necessary. During treatment, one or more of the tooth position targets can be generated from the information contained in an intermediate scan of the teeth, e.g., as described in co-owned U.S. Patent Application Publication No. 2010/0260405 (Cinader et al.). Subsequent appliances can be produced on an as-needed basis rather than producing the entire series of appliances at the outset of treatment. In one or more embodiments, the practitioner can fabricate the appliance entirely in the practitioner's office. This can give the practitioner more flexibility to adjust the appliance as the treatment progresses.

In one or more embodiments, one or both of the arch member 20 and the anchor 30 can be manufactured using 3D printing technology. For example, one or more data files can be selected by a practitioner that can then produce the orthodontic appliance 10 using 3D printing technology.

Figure 6:
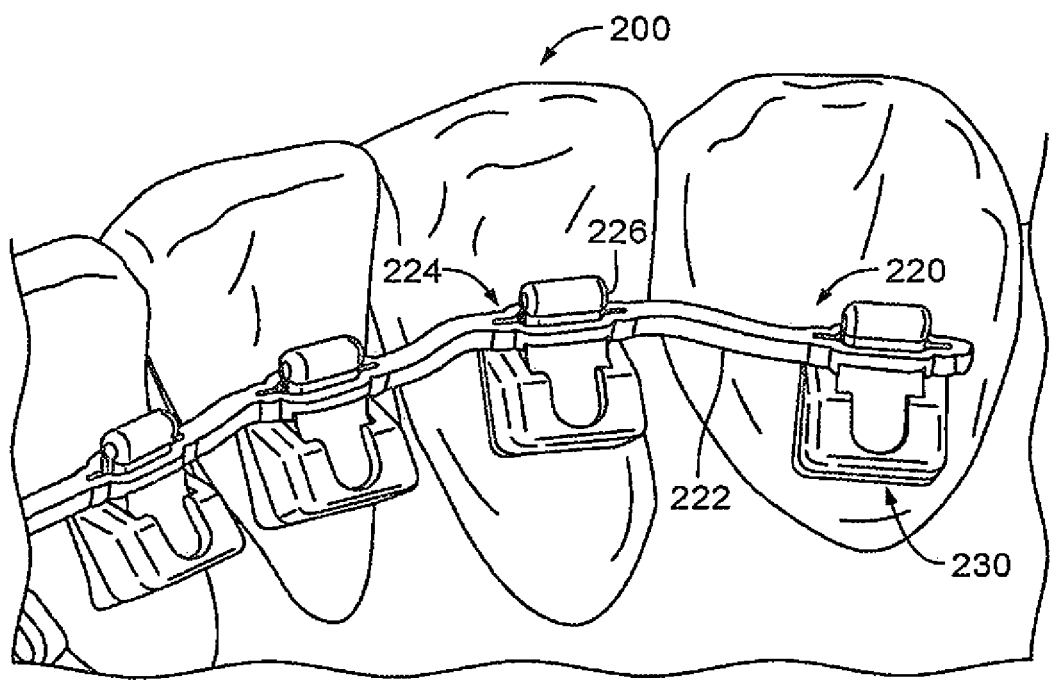
FIG. 6 is a schematic perspective view of a portion of another embodiment of an orthodontic appliance connected to surfaces of one or more teeth of a patient.
Figure 7:
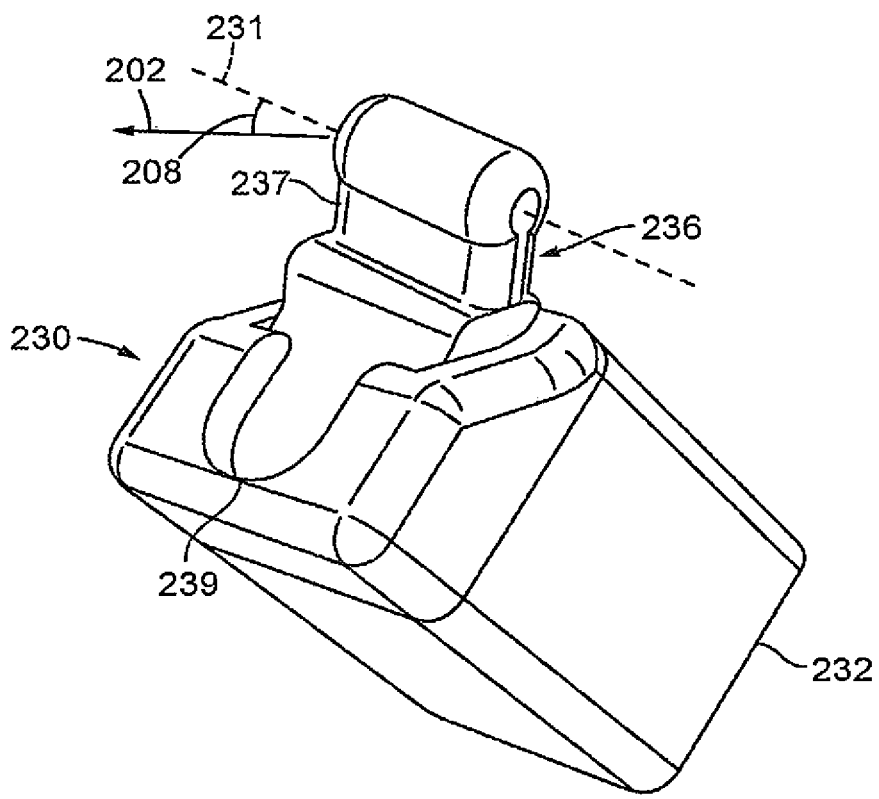
FIG. 7 is a schematic perspective view of an anchor of the orthodontic appliance of FIG. 6.

The arch member coupling 24 and the anchor coupling 34 can be designed in any suitable manner such that the arch member coupling is releasably connectable to the anchor coupling. For example, FIGS. 6-7 are schematic perspective views of a portion of another embodiment of an orthodontic appliance 200. All of the design considerations and possibilities regarding the orthodontic appliance 10 of FIGS. 1-4 apply equally to the appliance 200 of FIGS. 6-7. The appliance 200 includes an arch member 220 that includes an arch member body 222 and one or more arch member couplings 224 connected to the body. In one or more embodiments, the arch member coupling 224 can be integral with the arch member body 222. The one or more arch member couplings 224 can include a slotted portion 226 of the arch member body 222. The slotted portion 226 can take any suitable shape or combination of shapes and can be any suitable dimensions. In one or more embodiments, the slotted portion 226 can be formed using any suitable technique or combination of techniques. For example, in one or more embodiments, the slotted portion 226 can be formed when the arch member body 222 is formed using any suitable technique or combination of techniques. In one or more embodiments, the slotted portion 226 can be formed after the arch member body 222 is formed, e.g., the arch member body can be cut or etched to form the slotted portion. In one or more embodiments, the slotted portion 226 is resilient.

The appliance 200 also includes one or more anchors 230 that can each include an anchor coupling 234 and a base 232 adapted to connect the anchor to a surface 214 of a tooth 212. One or more anchor couplings 234 can include a post 236 that extends from the base 232 and is adapted to receive the slotted portion 226 of the arch member body 222. In one or more embodiments, the arch member coupling 224 is releasably connectable to the anchor coupling 234.

The anchor 230 can include an anchor coupling 234 that can take any suitable shape or combination of shapes and have any suitable dimensions. In the embodiment illustrated in FIGS. 6-7, the anchor coupling 234 includes the post 236 that extends from the base 232 of the anchor 230. The post 236 can take any suitable shape or combination of shapes. In the illustrated embodiment, the post 236 includes a cylindrical shape that is adapted to engage the slotted portion 226 of the arch member coupling 224. In one or more embodiments, the anchor coupling 234 can have any suitable cross-sectional shape and dimension. For example, in one or more embodiments, the anchor coupling 234 can have a polygonal, elliptical, or frusto-conical cross-sectional shape. The anchor coupling 234 can have a constant cross-sectional shape and size along a length of die anchor coupling that extends from the base 232 of the anchor 230. In one or more embodiments, the anchor coupling 234 can have a cross-sectional shape that varies along the length of the anchor coupling.

In one or more embodiments, the post 236 of the anchor coupling 234 can include an undercut portion or portions 237 that retain the slotted portion 226 of the arch member body 222 such that it remains engaged with the post 236. The post 236 can include any suitable dimensions and take any suitable shape or combination of shapes. In one or more embodiments, the post 236 can have a cross-sectional area in a direction orthogonal to a surface 214 of a tooth 212 that is greater than a width of the slotted portion 226 of the arch member body 222 such that the slotted portion expands when the post is inserted into the slotted portion. The arch member 220 can be connected to the anchor 230 by pressing the arch member in a gingival direction such that the post 236 is inserted into the slotted portion 226.

In one or more embodiments, the post 236 can extend from the base 232 along an axis that is normal to the base such that the arch member 220 can be connected to the anchor 230 by pressing the arch member onto the post in a distal direction. Further, the post 236 can be formed in the anchor 230 or manufactured separately and attached to the base 232 of the anchor. The post 236 can be attached directly to the base 232. In one or more embodiments, the post 236 can be inserted into a recess 239 of the anchor 230. In one or more embodiments, the recess 239 can be adapted to allow for adjustment of the post 236 to provide one or more selected corrective forces to the connected tooth 212. In one or more embodiments, an orientation of the post 236 of one or more anchors 230 can be adjusted at one or more stages of treatment. In one or more embodiments, an orientation of the post 236 of one or more anchors can be fixed throughout various stages of treatment.

The anchors 230 can be shaped such that any suitable corrective force or forces can be applied to the attached tooth. For example, in one or more embodiments, the post 236 can be formed or disposed on the base 232 such that it extends along an axis that forms any suitable angle with a normal vector to the tooth surface 214 in a plane orthogonal to the occlusal plane. By selecting the appropriate angle, a corrective force can be applied by the arch member 220 to the tooth that can correct for torque of the attached tooth. In one or more embodiments, the axis along which the post 236 extends can be formed or disposed such that it forms an angle with a normal to the tooth surface in a plane parallel to the mesio-distal direction. By selecting the appropriate angle, a corrective force can be applied by the arch member 220 to the tooth that can correct for a rotation of the tooth 212. In one or more embodiments, the post 236 can be formed or disposed such that it forms an angle with both of these planes to provide a corrective force that can correct both an angulation and a rotation of the tooth 212. In one or more embodiments, the anchor coupling 234 can be adapted to provide at least one of a selected torque, rotation, and angulation to the tooth when the arch member coupling 224 is connected to the anchor coupling of the anchor 230 and the anchor is connected to the tooth 212.

For example, FIG. 7 is a schematic perspective view of anchor 230 of the appliance 200 of FIG. 6. The post 236 of anchor 230 has been disposed within the recess 239 of anchor 230 such that an axis 231 that extends along a width of the post forms an angle 208 with the mesio-distal direction 202. Any suitable angle can be formed between the axis 231 and the mesio-distal direction 202. When connected to the arch member 220, the rotation of the post 236 can provide a corrective force that can correct for angulation of the tooth 212.

Figure 8:
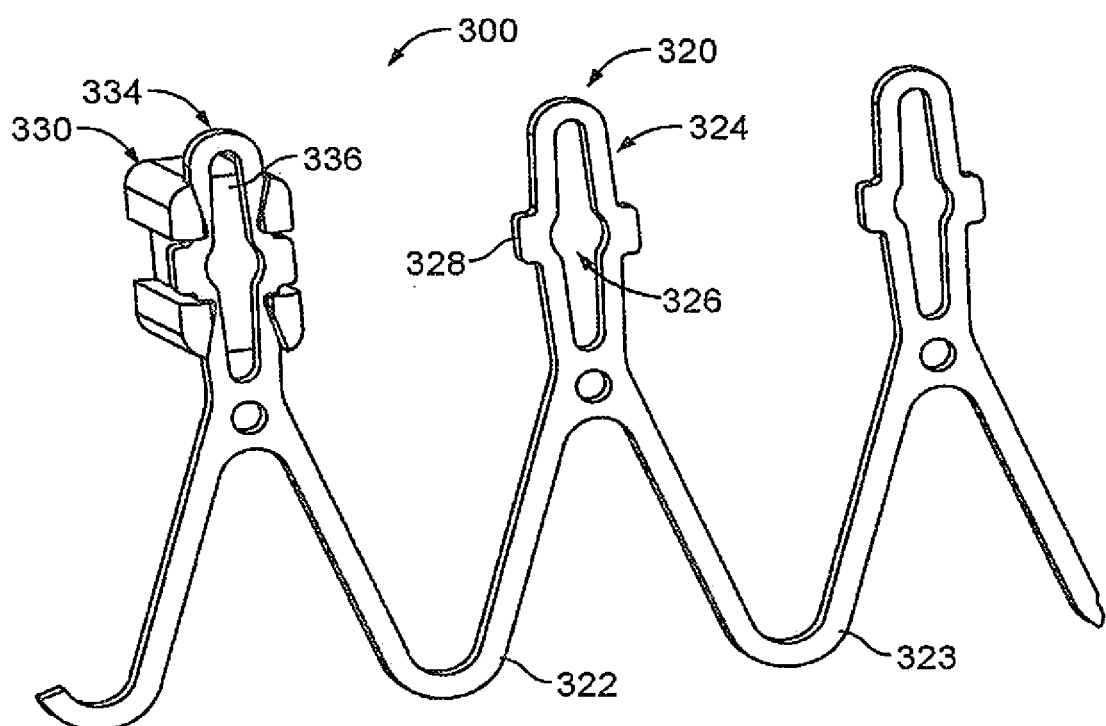
FIG. 8 is a schematic perspective view of a portion of another embodiment of an orthodontic appliance.

FIG. 8 is a schematic perspective view of a portion of another embodiment of an orthodontic appliance 300. All of the design considerations and possibilities regarding the orthodontic appliance 10 of FIGS. 1-4 apply equally to the orthodontic appliance 300 of FIG. 8. Orthodontic appliance 300 includes an arch member 320 that includes an arch member body 322 and one or more arch member couplings 324 connected to the body. The appliance 300 also includes one or more anchors 330 that each include an anchor coupling 334 and a base 332 adapted to connect the anchor to a surface of a tooth, e.g., a lingual surface. In one or more embodiments, the arch member coupling 324 is releasably connectable to the anchor coupling 334.

The anchor coupling 334 includes a slot 336 that is adapted to receive the arch member coupling 324 of the arch member 320. The slot 336 can take any suitable shape or combination of shapes. The arch member coupling 324 can include a slotted portion 326 that is adapted to be inserted into the slot 336 of the anchor coupling 334. In one or more embodiments, the slotted portion 326 is resilient such that it can be compressed within the slot 336 of the anchor 330 and retained therein. The arch member coupling 324 can also include one or more tabs 328 that are adapted to be received by the slot 336 of the anchor coupling 334. The tabs 328 can engage the slot 336 of the anchor coupling 334 such that the arch member 320 can provide, e.g., angulation to a tooth attached to the anchor 330.

One difference between the arch member 320 and arch member 20 of FIGS. 1-4 is that the body 322 includes one or more nonlinear (e.g., arcuate) portions that, in the illustrated embodiment, are V-shaped portions 323 that provide a spring-like effect to the arch member 320 and are substantially offset in a gingival direction from the anchors. Any suitable number of V-shaped portions can be formed between arch member couplings 324. In one or more embodiments, the V-shaped portions 323 can lie in a plane that is substantially parallel to a surface of a tooth that is connected to the arch member 320. As used herein, the term "substantially parallel" means that the V-shaped portions 323 (or U-shaped portions 523 below) lie in a plane that forms an angle with the surface of the one or more teeth that are connected to the appliance that is no greater than about 10 degrees. The V-shaped portions 323 can provide any suitable corrective force to one or more teeth that are attached to the arch member 320. The arch member 320 can be connected to the one or more anchors 330 such that the arch member is either in tension or compression, e.g., as is described herein regarding spring 121 of arch member 120 of FIG. 5.

Although not shown, one or more portions of the arch member 320 can include different geometries between arch member couplings 324 to provide one or more corrective forces that are different from the corrective forces provided by the V-shaped portions 323. Further, a cross-sectional geometry of the arch member body 322 can vary along the length of the arch member body in any suitable portion or portions, e.g., the portions of the body that include V-shaped portions 323. In one or more embodiments, a medial-distal distance between one or more arch member couplings 324 can be selected such that the V-shaped portion 323 has a selected apex angle.

The arch member 320 can be connected to the anchor 330 by pressing the arch member coupling 324 into the slotted portion 336 of the anchor coupling 334, thereby compressing the resilient slotted portion 326 of the arch member coupling against sides of the recessed portion. The arch member coupling 324, therefore, is friction-fit within the recessed portion 336 of the anchor coupling 334. The anchor coupling 334 can also include overhanging portions that can engage the arch member coupling 324 when the arch member coupling 324 is disposed within the recessed portion 336.

Figure 9:
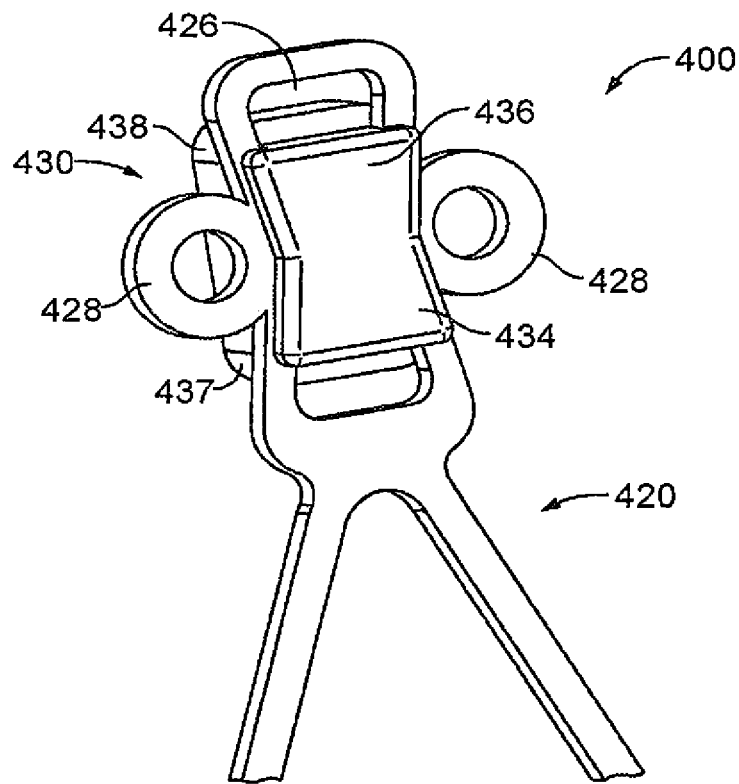
FIG. 9 is a schematic perspective view of a portion of another embodiment of an orthodontic appliance.

Any suitable couplings 324, 334 can be utilized with arch member 320 such that the arch member coupling is releasably connectable to the anchor coupling. For example, FIG. 9 is a schematic perspective view of a portion of another embodiment of an appliance 400. All of the design considerations and possibilities regarding the appliance 10 of FIGS. 1-4 and appliance 300 of FIG. 8 apply equally to the appliance 400 of FIG. 9. The appliance 400 includes an arch member 420 including an arch member body 422, and one or more arch member couplings 424 connected to the body. In one or more embodiments, one or more arch member couplings 424 can be integral with the arch member body 422. Further, in one or more embodiments, a cross-sectional geometry of the body 422 can vary along the length of the body. The appliance 400 can also include one or more anchors 430 each including an anchor coupling 434 and a base 432 adapted to connect die anchor to a surface of a tooth (not shown). In one or more embodiments, the arch member coupling 424 is releasably connectable to the anchor coupling 434. The anchor coupling 434 can also include overhanging portions that can engage the arch member coupling 424 when the arch member coupling 424 is connected to the anchor coupling.

One difference between appliance 400 and appliance 300 is that the anchor 430 includes a post 436 having one or more recessed portions 437 formed in the post to receive a slotted portion 426 of the arch member coupling 424. The slotted portion 426 is adapted to engage the post 436 of the anchor 430. In one or more embodiments, the arch member coupling 424 can also include tabs 428 that can include any suitable shape or combination of shapes. The tabs 428 can assist the practitioner in connecting and disconnecting the arch member 420 from the one or more anchors 430.

To connect the arch member 420 to the anchor 430, the anchor coupling 424 is pressed against the post 436 of the anchor coupling 434 such the slotted portion 426 expands over the post. As the slotted portion 426 engages the recessed portion 437 of the anchor 430, the slotted portion contracts against a surface or surfaces of the recessed portion. The arch member coupling 424 is, therefore, friction-fit against the anchor coupling 434.

Figure 10:
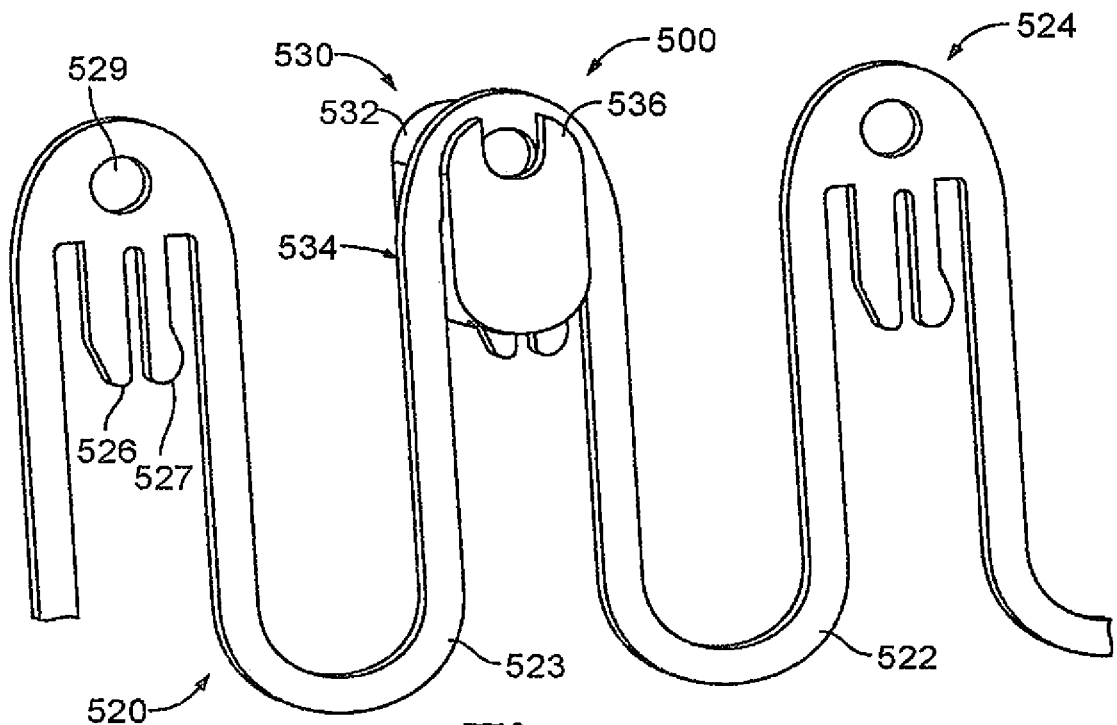
FIG. 10 is a schematic perspective view of a portion of another embodiment of an orthodontic appliance.

FIG. 10 is a schematic perspective view of a portion of another embodiment of an appliance 500. All of the design considerations and possibilities regarding the appliance 10 of FIGS. 1-4 and the appliance 300 of FIG. 8 apply equally to the appliance 500 of FIG. 10. The appliance 500 includes an arch member 520 including an arch member body 522, and one or more arch member couplings 524 connected to the body. In one or more embodiments, one or more arch member couplings 524 can be integral with the arch member body 522. Further, in one or more embodiments, a cross-sectional geometry of the body 522 can vary along the length of the body. The appliance 500 can also include one or more anchors 530 including an anchor coupling 534 and a base 532 adapted to connect the anchor to a surface of a tooth (not shown). In one or more embodiments, the arch member coupling 524 is releasably connectable to the anchor coupling 534.

One difference between appliance 500 and appliance 300 is that the body 522 of the arch member 520 includes one or more U-shaped portions 523. The U-shaped portions 523 can take any suitable shape or combination of shapes. Further, the U-shaped portions 523 can extend or lie within any plane or planes. In one or more embodiments, the U-shaped portions 523 lie in a plane that is substantially parallel to a surface of one or more teeth of a patient when the appliance is connected to the one or more teeth. The body 522 can include any suitable number of U-shaped portions 523 between each arch member coupling 524.

Another difference between appliances 500 and 300 is that the one or more arch member couplings 524 include one or more tabs 526 that are adapted to couple with one or more anchors 530. For example, in one or more embodiments, the anchor coupling 534 can include a slot 536. The slot 536 can take any suitable shape or combination of shapes. In one or more embodiments, the slot 536 is adapted to one or more receive tabs 526 of arch member coupling 524.

The arch member 520 can be attached or connected to one or more anchors 530 by pressing the arch member coupling 524 into the slot 536 of the anchor coupling 534 such that die tabs 526 engage the slot. One or more tabs 526 of arch member coupling 524 can also include a barb 527 of any suitable shape that engages the slot 536 of the anchor coupling 534 and retains the arch member 520 in a connected relationship with the anchor 530. Further, in one or more embodiments, at least one tab 526 can be bent around a portion of the slot 536 such that the arch member 520 remains connected to the anchor 530.

In one or more embodiments, the arch member coupling 524 can also include an opening 529 that is adapted to engage a tool that the practitioner can use to connect and/or disconnect the arch member coupling 524 to the anchor coupling in one or more embodiments, the anchor 530 can also include a recess (not shown) that can be aligned with the opening 529 of the arch member coupling 524 when the couplings are connected. The practitioner can insert a tool into the opening 529 of the arch member coupling 524 and the recess of the anchor 530 and lift the arch member coupling away from the anchor coupling 534 using the tool as a lever.

Although not shown, one or more portions of the arch member 520 can include different geometries between arch member couplings 524 to provide one or more corrective forces that are different from the corrective forces provided by the U-shaped portions 523. Further, a cross-sectional area of the arch member body 522 can vary along the length of the arch member body in any suitable portion or portions of the body, e.g., portions of the body that include U-shaped portions 523.

Figure 11:
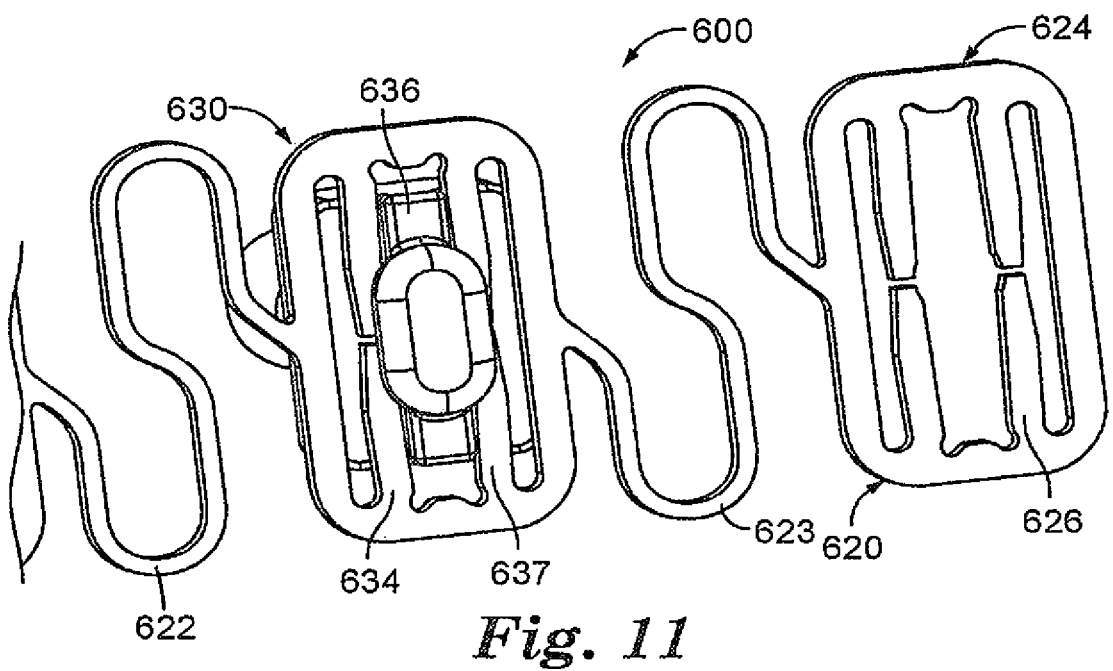
FIG. 11 is a schematic perspective view of a portion of another embodiment of an orthodontic appliance.

FIG. 11 is a schematic perspective view of a portion of another embodiment of an orthodontic appliance 600. All of the design considerations and possibilities regarding the orthodontic appliance 10 of FIGS. 1-4 and the orthodontic appliance 300 of FIG. 8 apply equally to the orthodontic appliance 600 of FIG. 11. The appliance 600 includes an arch member 620 including an arch member body 622, and one or more arch member couplings 624 connected to the body. In one or more embodiments, one or more arch member couplings 624 can be integral with the arch member body 622. Further, in one or more embodiments, a cross-sectional geometry of the body 622 can vary along the length of the body. The appliance 600 can also include one or more anchors 630 each including an anchor coupling 634 and a base 632 adapted to connect the anchor to a surface of a tooth (not shown). In one or more embodiments, the arch member coupling 624 is releasably connectable to the anchor coupling 634.

One difference between the appliance 600 of FIG. 11 and appliance 300 of FIG. 8 is that the arch member coupling 624 includes one or more resilient fingers 626. Any suitable number of resilient fingers 626 can be formed in or attached to arch member body 622. The resilient fingers 626 are adapted to releasably connect the arch member coupling 624 to the anchor coupling 634 of the anchor 630. In the illustrated embodiment, the anchor coupling 634 includes a post 636 that extends from the base 632 of the anchor 630. The post 636 can take any suitable shape or combination of shapes. In one or more embodiments, the post 636 can include one or more recessed portions 637 that are adapted to receive the flexible fingers 626 of the arch member coupling 624.

Another difference between appliance 600 and appliance 300 is that the arch member 620 includes one or more S-shaped portions 623 that can provide any suitable corrective force or forces to one or more teeth that are connected to the arch member. Also, unlike arch members 420 and 520, the nonlinear S-shaped portions 623 do not substantially extend beyond the occlusal and gingival edge regions of arch member couplings 624. The arch member 620 can, however, include any suitable number of S-shaped portions between arch member couplings 624. In one or more embodiments, the arch member 620 can be connected to one or more anchors 630 such that the S-shaped portions are either in tension or compression as described, e.g., regarding spring 121 of FIG. 5. Although not shown, one or more portions of the arch member 620 can include different geometries between arch member couplings 624 to provide one or more corrective forces that are different from the corrective forces provided by the S-shaped portions 623.

Further, a cross-sectional geometry of the arch member body 622 can vary along the length of the arch member body in any suitable portion or portions of the body, e.g., portions that include S-shaped portions 623.

To couple the arch member 620 to the anchor 630, the arch member coupling 624 can be pressed against the anchor coupling 634 such that the resilient fingers 626 are displaced around the post 636. The fingers 626 can engage the recessed portion 637 of the post 636 to keep the arch member 620 connected to the anchor 630. Further, in one or more embodiments, the fingers 626 can also provide a corrective force to the attached tooth, e.g., a rotational force.

Figure 12:
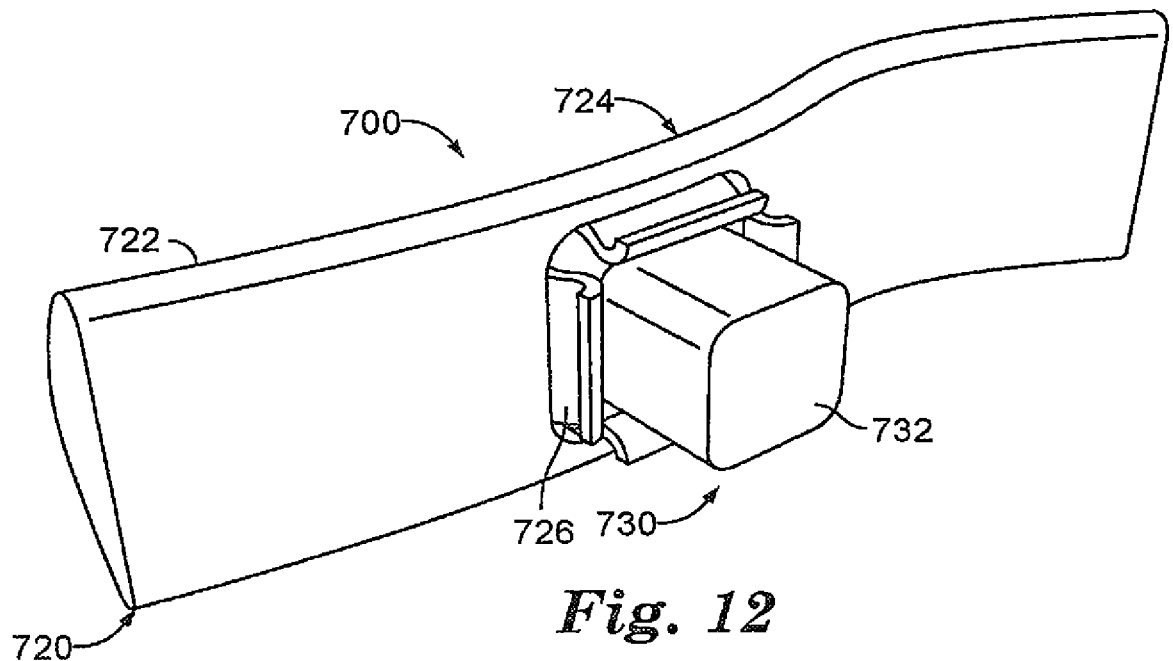
FIG. 12 is a schematic perspective view of a portion of another embodiment of an orthodontic appliance.
Figure 13:
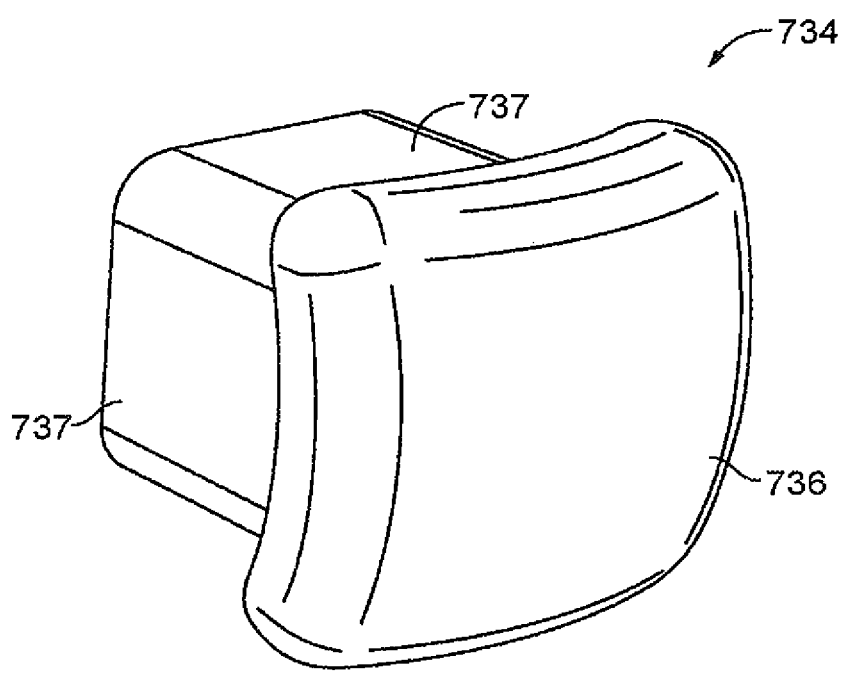
FIG. 13 is a schematic perspective view of an anchor of the orthodontic appliance of FIG. 12.

FIGS. 12-13 are schematic perspective views of a portion of another embodiment of an orthodontic appliance 700. All of the design considerations and possibilities regarding the orthodontic appliance 10 of FIGS. 1-4 and the orthodontic appliance 300 of FIG. 8 apply equally to appliance 700 of FIGS. 12-13. The appliance 700 includes an arch member 720 including an arch member body 722, and one or more arch member couplings 724 connected to the body. In one or more embodiments, one or more arch member couplings 724 can be integral with the arch member body 722. Further, in one or more embodiments, a cross-sectional geometry of the body 722 can vary along the length of the body. The appliance 700 can also include one or more anchors 730 including an anchor coupling 734 and a base 732 adapted to connect the anchor to a surface of a tooth (not shown). In one or more embodiments, the arch member coupling 724 is releasably connectable to the anchor coupling 734.

One difference between appliance 700 of FIGS. 12-13 and appliance 10 of FIGS. 1-4 is that the arch member coupling 724 includes one or more resilient tabs 726 are adapted to engage a post 736 of anchor 730 that extends from the base 732 of the anchor. The post 736 can also include one or more recessed portions 737 that are adapted to engage the tabs 726 of the arch member coupling 724.

To connect the arch member 720 to the anchor 730, the arch member coupling 724 is pressed against the post 736 of the anchor coupling 734 such that the resilient tabs 726 of the arch member coupling are deflected and engage the surface of the post until the tabs reach the recessed portions 737. Once the tabs 726 engage the recessed portions 737, the arch member coupling 724 is releasably connected to the anchor coupling 734.

Figure 14:
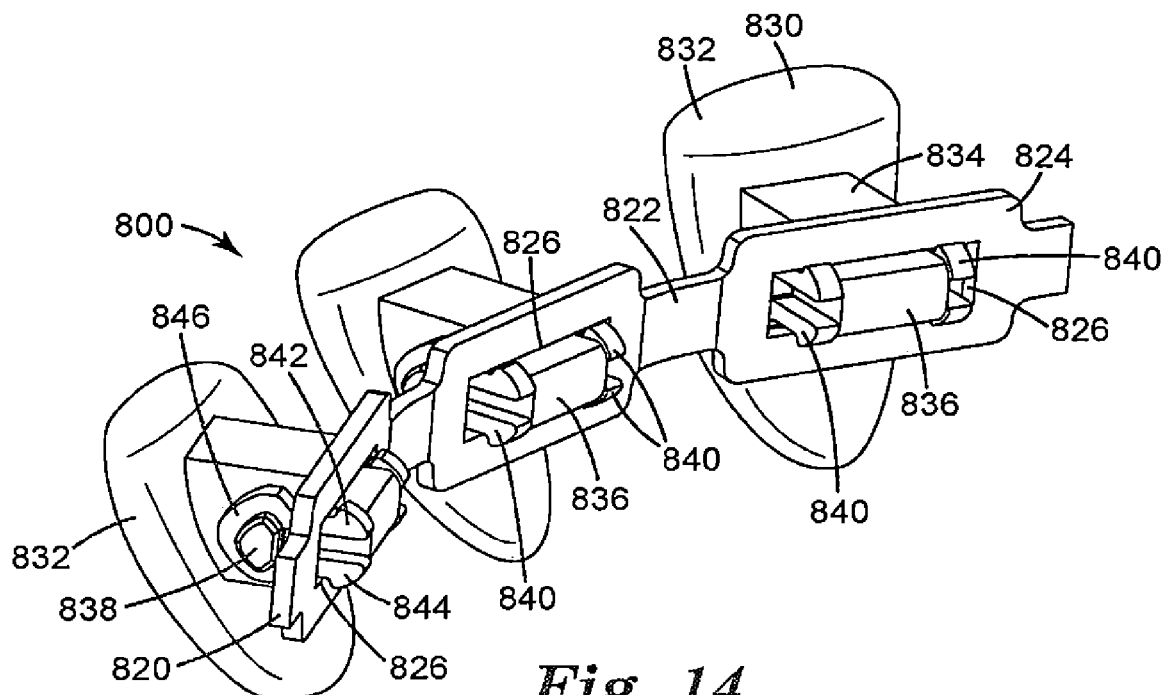
FIG. 14 is a schematic perspective view of a portion of another embodiment of an orthodontic appliance.
Figure 15:
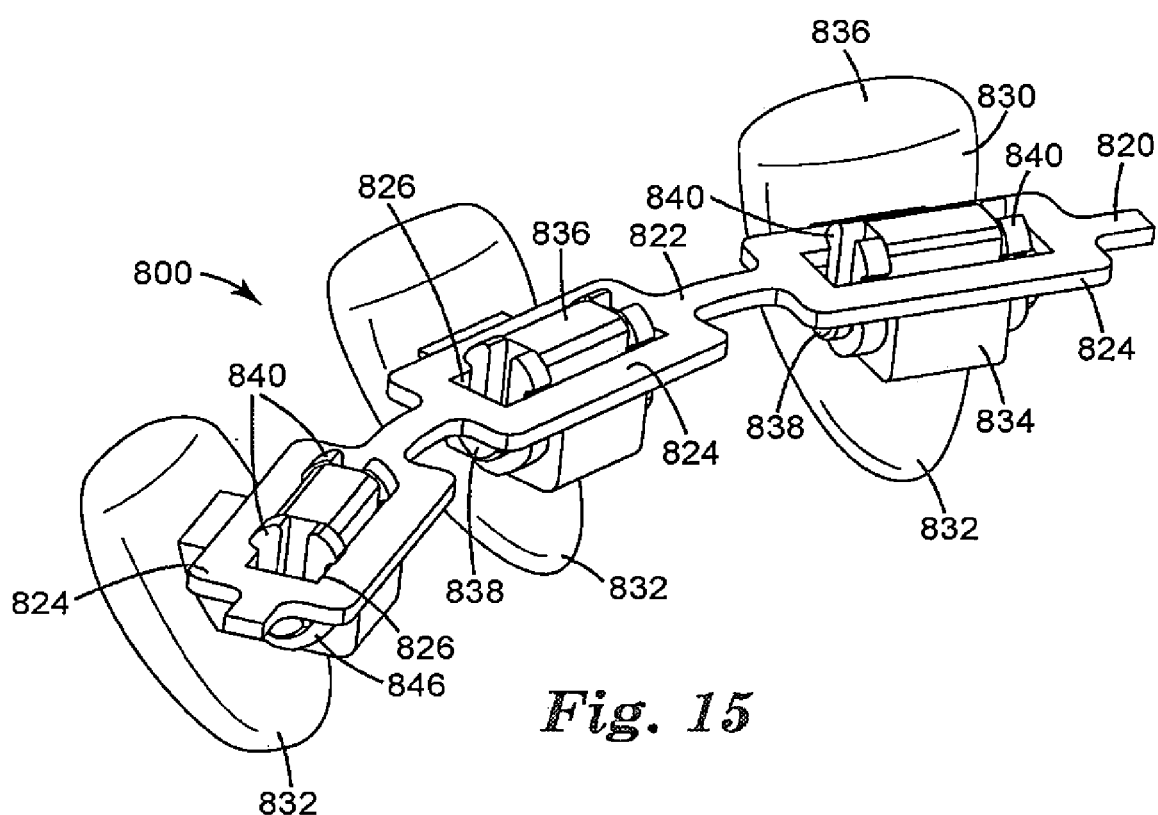
FIG. 15 is a schematic perspective view of a portion of another embodiment of an orthodontic appliance.

FIGS. 14-15 are schematic perspective views of a portion of another embodiment of an orthodontic appliance 800. All of the design considerations and possibilities regarding the orthodontic appliance 10 of FIGS. 1-4 and the orthodontic appliance 300 of FIG. 8 apply equally to appliance 800 of FIGS. 14-15. The appliance 800 includes an arch member 820 including an arch member body 822, and one or more arch member couplings 824 connected to the body. In one or more embodiments, one or more arch member couplings 824 can be integral with the arch member body 822. Further, in one or more embodiments, a cross-sectional geometry of the body 822 can vary along the length of the body. The appliance 800 can also include one or more anchors 830 including an anchor coupling 834 and a base 832 adapted to connect the anchor to a surface of a tooth (not shown). In one or more embodiments, the arch member coupling 824 is releasably connectable to the anchor coupling 834.

One difference between appliance 800 of FIGS. 14-15 and appliance 10 of FIGS. 1-4 is that the anchor coupling 834 includes at least one clip 840 adjacent a post 836 that extends from the base 832 of the anchor, with the clip(s) 840 adapted to engage a slot 826 of the arch member coupling 824. The anchor 830 includes a pair of clips 840 in the embodiment depicted in FIGS. 14 and 15. Each clip 840 includes a pair of arm portions 842, 844 that can extend in generally labial-lingual (FIG. 14) or occlusal-gingival (FIG. 15) directions and then bend outwardly away from each other. A protrusion 838 on each of the mesial and distal faces of the post 836 extend through the clips 840, thereby retaining the clips 840 on die anchor 830.

Using a dual clip configuration can provide improved stability over using a single clip by leveraging two engagement points per clip on either side of the arch member coupling 824. Having a plurality of engagement points helps prevent the arch member 820 from rotating about the post 836, thereby resulting in a more secure coupling.

The clips 840 are shown in their normal, relaxed orientations in FIGS. 14 and 15. However, the arm portions 842 of each clip 840 are movable towards each other in order to engage and be received in the slot 826 when so desired. The smooth, outer edge of the arm portions 842, 844 enables each clip 840 to engage an arch member by pressing the arch member coupling slot 826 against the outer curved edges of the arm portions 842, 844. As pressure is exerted by the arch member coupling 824 on the curved edges, the arm portions 842, 844 deflect towards each other in order to admit the clips 840 into the slot 826.

Once the arm portions 842, 844 extend through the slot 826, they will deflect away from one another and return the clip 840 to its relaxed configuration. Once an arm portion of the clip 840 engages the walls of the slot 826, the arch member coupling 824 is releasably connected to the anchor coupling 834. In one or more embodiments, the width of the clip 840 in the area between arm portions 842, 844 and protrusion receiving region 846 is greater than or equal to a width of the slot 826. In such embodiments, the clip 840 may apply sufficient expansionary force to the arch member coupling 824 to prevent movement of the arch member body 820 in directions along the longitudinal axis of the arch member 822. Optionally, inner surfaces of the clips 840 may be roughened or knurled or provided with serrations, grooves or other structure to facilitate a secure, non-sliding connection between the clips 840 and the arch member 820.

To remove the arch member 820 from the anchor 830, the practitioner can compress the arm portion 842, 844 together using a suitable hand instrument, and may slide the arch member coupling 824 along the compressed clip 840.

Optionally, each of the clips 840 is cut from a flat section of metallic stock material. Suitable metallic materials include shape memory alloys such as alloys of nitinol and beta-titanium. The clips 840 may be cut from the stock material using a stamping, die cutting, chemical etching, EDM (electrical discharge machining), laser cutting or water jet cutting process. As another option, each clip 840 could be formed and then heat-treated to set its shape. Other suitable clip features are given in issued U.S. Pat. No. 7,252,505 (Lai) and U.S. Pat. No. 7,367,800 (Lai et al.).

In general, the various embodiments of arch members and anchors can be used interchangeably to provide selected treatments. For example, in one exemplary embodiment, one or more teeth of a patient may be connected to anchors 230 of appliance 200 illustrated in FIGS. 6-7, with the anchors coupled to an arch member that includes couplings 224, and one or more additional teeth may be connected to anchors 30 of the appliance 10 illustrated in FIGS. 1-4, with the anchors coupled to one or more couplings 24 four or connected to the same arch member. In one or more embodiments, different embodiments of appliances can be used for different phases of treatment. For example, the appliance 300 of FIG. 8 may be utilized in an early treatment phase, and the appliance 10 of FIGS. 1-4 may be utilized in a later treatment phase of the same patient.

The various embodiments of orthodontic appliances of the present disclosure can be utilized with any suitable orthodontic treatment system. For example, in one or more embodiments, an orthodontic treatment system can include an orthodontic appliance, e.g., orthodontic appliance 10. The orthodontic appliance can include a set of arch members (e.g., arch member 20 of FIGS. 1-4). Each arch member 20 can include an arch member body 22 and an arch member coupling 24 connected to the body. The appliance can also include a set of anchors (e.g., anchor 30 of FIGS. 1-3) that are adapted to connect to respective teeth of a patient's dental arch. Each anchor 30 can include an anchor coupling 34 and a base 32 adapted to connect the anchor to a surface of the tooth. Each arch member coupling can be releasably connectable to the anchor coupling of an anchor of the set of anchors.

In one or more embodiments, a first arch member of the set of arch members can have a geometry (e.g., shape, cross-sectional area, etc.) selected to move at least one tooth from a first arrangement to a second arrangement. Further, in one or more embodiments, a second arch member of the set of arch members can have a geometry (e.g., shape, cross-sectional area, etc.) selected to move at least one tooth from the second arrangement to a third arrangement.

The various embodiments of orthodontic appliances described herein can be utilized with any suitable additional appliances. For example in one or more embodiments, orthodontic appliance 10 of FIGS. 1-4 can be utilized with one or more brackets, buccal tubes, bands, cleats, buttons, removable appliances (including aligner trays), palatal expanders, and combinations thereof. One or more additional appliances can be adapted to be connected to an orthodontic appliance (e.g., appliance 10 of FIGS. 1-4). For example, a palatal expander can be adapted to be connected to an orthodontic appliance using any technique or combination of techniques. In one or more embodiments, one or more additional appliances can be used simultaneously with one or more appliances but not be connected to such appliance.

The various embodiments of orthodontic appliances described herein can be manufactured using any suitable technique or combination of techniques, e.g., the techniques described in U.S. Patent Application Publication No. 2010/0260405 (Cinader, Jr.) and U.S. Provisional Patent Application Ser. No. 62/097,733. In reference to orthodontic appliance 10 of FIGS. 1-4, one exemplary technique includes providing a physical dental model of a patient's teeth that can be used to form the appliance 10. The configuration of the dental model can represent a target dental arrangement as perceived by the treating professional. As defined herein, the "target dental arrangement" may be a patient's current dental arrangement, a desired final dental arrangement, or a predicted intermediate dental arrangement, depending on the application contemplated by the treating professional. In one or more embodiments, the target dental arrangement can also include a desired arrangement of one or more anchor couplings.

If the target dental arrangement is defined as the patient's current dental arrangement, then the dental model can be provided, for example, from an epoxy resin or stone casting prepared from an alginate, polyvinylsiloxane, or polyether impression of a patient's dentition. If the target dental arrangement is defined as an intermediate or final dental arrangement, then this casting may be sectioned into individual model tooth elements, and the tooth elements can be rearranged to form the desired dental arrangement. Further, the tooth elements can be waxed back together to provide the dental model. In one or more embodiments, the dental model can also be a reconfigurable dental model, thereby allowing individual teeth to be rearranged without sectioning. Examples of reconfigurable dental models are described, e.g., in U.S. Pat. No. 6,227,851 (Chishti et al.) and U.S. Pat. No. 6,394,801 (Chishti et al.).

The dental model can be used as a template to make and configure the orthodontic appliance 10. The anchors 30 can be connected to the respective lingual and/or labial tooth surfaces of the dental model. The arch member 20 can be formed into a desired configuration using any suitable technique or combination of techniques such that the arch member couplings 24 are releasably connectable to the anchor couplings 34 of anchors 30. In one or more embodiments, the arch member body 22 can be formed by extrusion and then shaped using known techniques. In one or more embodiments, the arch member body 22 can be formed by cutting, stamping, or etching a substrate. In one or more embodiments, a polymeric material can be thermoformed or cast to provide an arch member body 22, and one or more arch member couplings 24 can be connected to the arch member body. In one or more embodiments, the arch member body 22 can be formed using 3D printing techniques.

Once the arch member body 22 is formed, the arch member couplings 24 can be disposed along the arch member body such that the arch member couplings are connected to die arch member body. In one or more embodiments where the arch member couplings 24 are formed along with the arch member body 22 (e.g., arch member body 320 of FIGS. 7-8), the arch member couplings can be formed by slitting or etching one or more slots in the arch member body. In one or more embodiments, the slots can be disposed in the arch member body 22 during thermoforming or casting of the arch member 20.

To use the appliance 10, the anchors 30 are transferred from the dental model to the patient's teeth. To preserve the precise locations of the anchors 30 relative to the respective teeth, an indirect bonding tray or other transfer apparatus can be utilized. If the anchors 30 are customized to the lingual surfaces of the patient's teeth and thereby self-positioning, direct bonding may be a viable alternative. The arch member 20 can be placed in the patient's mouth and releasably connected to the anchors 30 via the arch member couplings 24.

By performing operations in a virtual world, it is also possible for one or more of these steps to be consolidated or even eliminated. Various digital techniques can potentially improve the precision of appliance design and facilitate aspects of the fabrication process that are traditionally done by hand.

One exemplary technique is digital scanning. A virtual dental model representing the patient's dental structure can be captured using a digital intraoral scan or by digitally scanning an impression or dental model. The digital images may be provided using a hand-held intra-oral scanner such as the intra-oral scanner using active wavefront sampling developed by Brontes Technologies, Inc. (Lexington, Mass.) and described, e.g., in PCT Publication No. WO 2007/084727 (Boerjes et al.). In one or more embodiments, other intra-oral scanners or intra-oral contact probes may be used. As another option, the digital structure data may be provided by scanning a negative impression of the patient's teeth. As still another option, the digital structure data may be provided by imaging a positive physical model of the patient's teeth or by using a contact probe on a model of the patient's teeth. The model used for scanning may be made, for example, by casting an impression of a patient's dentition from a suitable impression material such as alginate or polyvinylsiloxane (PVS), pouring a casting material (such as orthodontic stone or epoxy resin) into the impression, and allowing the casting material to cure. Any suitable scanning technique may be used for scanning the model, including X-ray radiography, laser scanning, computed tomography (CT), magnetic resonance imaging (MRI), and ultrasound imaging. Other possible scanning methods are described, e.g., in U.S. Patent Application Publication No. 2007/0031791 (Cinader et al).

From there, it is possible for a treating professional to manipulate the virtual dental model on a computer, for example, to arrive at the target dental arrangement. Further details on software and processes that may be used to derive the target dental arrangement are disclosed, e.g., in U.S. Pat. No. 6,739,870 (Lai et al.), U.S. Pat. No. 8,194,067 (Raby et al), U.S. Pat. No. 7,291,011(Stark et al.), U.S. Pat. No. 7,354,268 (Raby et al), U.S. Pat. No. 7,869,983 (Raby et al.) and U.S. Pat. No. 7,726,968 (Raby et al).

Another digital technique that can facilitate preparation of the dental model is rapid prototyping. After a virtual dental model has been created using any of the above techniques, rapid prototyping techniques can allow the dental model to be directly fabricated from this virtual dental model. Advantageously, there is no need to take an alginate impression or cast a stone model. Examples of rapid prototyping techniques include, but are not limited to, three-dimensional (3D) printing, selective area laser deposition or selective laser sintering (SLS), electrophoretic deposition, robocasting, fused deposition modeling (FDM), laminated object manufacturing (LOM), stereolithography (SLA) and photostereolithography. These and other methods of forming a positive dental model from scanned digital data are disclosed, e.g., in U.S. Pat. No. 8,535,580 (Cinader).

In one or more embodiments, the anchors 30 can be connected to the patient's teeth prior to taking an impression or intraoral scan. Since the anchors 30 can be directly bonded to the patient's teeth, this can simplify the process by eliminating the need to bond the anchors to the physical dental model, as well as the need to transfer the anchors to the patient's teeth. As before, the manipulation of the dental model from the maloccluded dental arrangement to the target dental arrangement may be carried out on a computer. There are other potential benefits. For example, if the anchors 30 and the patient's teeth are captured together in an intraoral scan, it is possible to digitally configure arch member 20 using a wire bending apparatus or robot based on the relative locations of the anchors and the patient's teeth.

Rapid prototyping may even eliminate the need to provide a physical dental model for fabricating the appliance 10. While it has been shown that rapid prototyping can be used to fabricate a dental model, it is also conceivable that rapid prototyping could be used to directly fabricate at least a portion of the appliance 10. The configuration of the arch member body 22, the anchors 30, and the couplings 24, 34 can be carried out with die assistance of rapid prototyping techniques. Direct fabrication can provide potential cost and time savings by eliminating intermediate steps in the fabrication of the appliance 10.

If the appliance 10 is directly fabricated from a virtual dental model, a physical dental model may still be useful to verify the appliance for quality control purposes. This may be carried out by seating the arch member 20 against a physical dental model and observing that each arch member coupling 24 releasably connects to a respective anchor 30. Assuming that the appliance 10 is properly configured and the dental model represents the target dental arrangement, the arch member 20 should be relaxed when releasably connected to the anchors 30. This procedure can also be used to verify the appliance 10 on a dental model representing a maloccluded (or non-desired) dental arrangement to ensure that the arch member couplings 24 of the arch member 20 can properly connect to the corresponding anchor couplings 34 anchors 30. In this case, the appliance 10 is active, so one or more portions of the arch member body 22 should be acting in force-transmitting engagement upon releasably connecting the arch member 20 to the anchors 30.

In one or more embodiments, the arch member 20 of the appliance 10 can be reconfigured during the course of treatment. Reconfiguring the arch member 20 and, in one or more embodiments, one or more anchors 30, can be an efficient and cost-effective alternative to fabricating a series of arch members. For example, the arch member 20 may be reconfigured to guide teeth through two or more dental arrangements during the course of treatment by making manual adjustments (e.g., bends) to one or more portions of the arch member body 22. This can also be used advantageously to re-activate the appliance 10. For example, if the patient's teeth have moved to an extent that the current appliance 10 is no longer exerting sufficient corrective force to effect tooth movement, the treating professional has the freedom to restore the corrective forces applied by the appliance by making appropriate adjustments to the arch member body 22. In one or more embodiments, such adjustments can also be made to overcorrect or compensate for anticipated relapse of one or more teeth. Optionally, the locations of the anchors 30 are captured beforehand using an intraoral scan or other scanning technique, and this information can be used to configure the arch member body 22 automatically using a wire bending apparatus or robot.

In one or more embodiments, a series of two or more arch members 20 can be formed to provide a progressive treatment that applies selected corrective forces to one or more teeth such that the teeth are repositioned from an initial maloccluded position to a final target position through, for at least one or more teeth, one or more intermediate positions.

The various embodiments of orthodontic appliances described herein can be utilized in any suitable application. In one application, an appliance (e.g., orthodontic appliance 10 of FIGS. 1-4) functions as a retainer that maintains the patient's teeth in their current positions. For this application, the dental model used to fabricate appliance 10 is a replica of the patient's current dental structure. Since the dental model has the same configuration as the patient's dental structure, appliance 10 would be applying essentially zero corrective force to the teeth when placed in the mouth. If one or more of the teeth relapse, or change location or orientation, then the appliance 10 can urge the wayward teeth back to their original positions.

In a second application, appliance 10 can be adapted to actively move teeth from current maloccluded positions to final, desired positions. More specifically, one or more portions of the arch member body 22 can be shaped to provide one or more corrective forces when the arch member couplings 24 are releasably connected to the anchor couplings 34. The inherent memory of the resilient arch member body 22 can provide corrective forces to one or more teeth as the shaped portions relax to their normal configuration. In this application, the dental model used to fabricate the appliance 10, therefore, represents the final dental arrangement envisioned by the treating professional.

In a third application, appliance 10 can be configured to move teeth to an intermediate, non-final dental arrangement. This situation may be encountered when the severity or complexity of the malocclusion is such that a single appliance is insufficient to reposition teeth from initial to final positions. In these cases, treatment may be conducted in multiple stages where a series of two or more arch members 20 are sequentially used with a single set of anchors 30 to incrementally and progressively move teeth from an initial maloccluded dental arrangement to a final corrected dental arrangement. Here, the dental model used to fabricate the appliance 10 can represent an intermediate dental arrangement that may be observed during the course of treatment.

In an exemplary embodiment of the third application, a first arch member 20 is connected to the anchors 30 to re-position a patient's maloccluded teeth to an intermediate dental arrangement. The first arch member 20 is then removed from the oral cavity. Next, a second arch member that has a configuration when relaxed that is different from the configuration of the first arch member when relaxed can be used in a similar fashion to re-position the patient's teeth from the intermediate dental arrangement to a final dental arrangement. If desired, the above process can be extended to two or more intermediate dental arrangements. In one or more embodiments, the first arch member and the second arch member can include the same configuration, but the second arch member can have material properties that are different from the first arch member. For example, one or more portions of the second arch member can include a stiffness that provides a corrective force or forces that are different from the corrective force or forces provided by the first arch member.

Dental models representing intermediate or final dental arrangements can be fabricated by manually forming, sectioning, and re-assembling a physical dental casting. Digital techniques can also be used. For example, a final dental arrangement can be determined using a computer algorithm or input from a treating professional, and one or more intermediate dental arrangements derived by sub-dividing the treatment into a series of discrete steps can be derived. In one or more embodiments, one or more of the intermediate dental arrangements can include a reduced image as is described, e.g., in U.S. Patent Publication No. 2010/0260405 (Cinader). Once each intermediate or final dental arrangement has been derived in such fashion, respective dental models may be directly fabricated using rapid prototyping methods. Each respective intermediate or final arch member 20 can be fabricated from the dental models using any suitable technique or combination of techniques.

In one or more embodiments that utilize progressive treatment of a patient's teeth, second, third, or more intermediate scans of the teeth can be performed using any suitable technique or combination of techniques. The practitioner or manufacturer can then utilize these intermediate scans to provide one or more additional arch members 20 that are adapted to provide one or more corrective forces to the teeth such that one or more teeth are repositioned to either a subsequent intermediate arrangement or a final target arrangement. Any suitable technique or combination of techniques can be utilized to provide these intermediate scans, models, and arch members, e.g., the techniques described in U.S. Patent Application Publication No. 2010/0260405 (Cinader Jr.) and U.S. Provisional Patent Application Ser. No. 62/097,733.

In general, an orthodontic appliance (e.g., appliance 10 of FIGS. 1-4) can be formed by providing a proposed specification of the orthodontic appliance, where the orthodontic appliance includes the arch member 20 that includes the arch member body 22 and the arch member coupling 24 connected to the arch member body. The appliance also includes a set of anchors 30, each anchor including the anchor coupling 34 and the base 32 adapted to connect the anchor to a surface of a tooth. Each arch member coupling 24 is releasably connectable to an anchor coupling 34.

A first digital image representing a first dental arrangement associated with the orthodontic appliance 10 can be provided using any suitable technique or combination of techniques. A target digital image representing a target dental arrangement can be derived, e.g., by physically or virtually moving teeth in the first dental arrangement to one or more desired positions. The proposed specification of the orthodontic appliance 10 can be revised based at least in part on the target digital image. And the orthodontic appliance 10 can be formed based on the target digital image.

In one or more embodiments, a second digital image representing a second dental arrangement can be provided using any suitable technique or combination of techniques. At least one tooth in the second dental arrangement can be in a different position from the corresponding tooth in the first dental arrangement. A revised target digital image representing the second dental arrangement can be derived, e.g., by physically or virtually moving teeth in the first dental arrangement to desired positions. The proposed specification of the orthodontic appliance 10 can be revised based in part on the revised target digital image. And the orthodontic appliance 10 can be revised based on the revised proposed specification.

Embodiments

1. An orthodontic appliance comprising:
a first anchor comprising an anchor coupling and a base adapted to connect the first anchor to a surface of a first tooth, and a second anchor comprising an anchor coupling and a base adapted to connect the second anchor to a surface of a second tooth; and an arch member comprising an arch member body and first and second arch member couplings integral with the body, the arch member body comprising a cross-sectional geometry that varies along a length of the body; wherein the first arch member coupling is releasably connectable to the anchor coupling of the first anchor and the second arch member coupling is releasably connectable to the anchor coupling of the second anchor, and further wherein the arch member body comprises a first nonlinear portion between the first arch member coupling and the second arch member coupling that is adapted to be spaced apart from the surfaces of the first and second teeth when the first and second anchors are connected to the surfaces of the first and second teeth and the first and second arch member couplings are releasably connected to the anchor couplings of the first and second anchors.

2. The appliance of embodiment 1, wherein the arch member body and the first anchor are in a fixed relationship when the first arch member coupling is connected to the anchor coupling of the first anchor.

3. The appliance of embodiment 1, wherein the first anchor is adapted for displacement relative to the arch member body when the first anchor is connected to the first tooth and the first arch member coupling is releasably connected to the anchor coupling of the first anchor.

4. The appliance of any one of embodiments 1 to 3, wherein the arch member comprises a self-ligating arch member.

5. The appliance of any one of embodiments 1 to 4, wherein the first nonlinear portion extends in at least one of a gingival, occlusal, labial, and lingual direction when the first and second anchors are connected to the surfaces of the first and second teeth and the first arch member coupling and the second arch member coupling are connected to the anchor coupling of the first anchor and the anchor coupling of the second anchor respectively.

6. The appliance of any one of embodiments 1 to 4, wherein the first nonlinear portion extends in at least one of a labial and a lingual direction when the first and second anchors are connected to the surfaces of the first and second teeth and the first arch member coupling and the second arch member coupling are connected to the anchor coupling of the first anchor and the anchor coupling of the second anchor respectively.

7. The appliance of any one of embodiments 1 to 4, wherein the first nonlinear portion extends in at least one of a gingival and occlusal direction when the first and second anchors are connected to the surfaces of the first and second teeth and the first arch member coupling and the second arch member coupling are connected to the anchor coupling of the first anchor and the anchor coupling of the second anchor respectively.

8. The appliance of any one of embodiments 1 to 7, wherein the arch member body comprises a third arch member coupling and a second nonlinear portion between the second arch member coupling and the third arch member coupling, wherein a shape of the first nonlinear portion between the first and second arch member couplings is different from a shape of the second nonlinear portion between the second and third arch member couplings.

9. The appliance of any one of embodiments 1 to 8, wherein the first nonlinear portion comprises a V-shaped portion.

10. The appliance of any one of embodiments 1 to 9, wherein the first nonlinear portion comprises a U-shaped portion.

11. The appliance of any one of embodiments 1 to 10, wherein the first nonlinear portion comprises an S-shaped portion.

12. The appliance of any one of embodiments 1 to 11, wherein the first nonlinear portion comprises a sinusoidal-shaped portion.

13. The appliance of embodiment 12 wherein the sinusoidal portion extends in both gingival and occlusal directions when the first and second anchors are connected to the surfaces of the first and second teeth and the first arch member coupling and the second arch member coupling are connected to the anchor coupling of the first anchor and the anchor coupling of the second anchor respectively.

14. The appliance of embodiment 12, wherein the sinusoidal portion extends in both mesial and distal directions when the first and second anchors are connected to the surfaces of the first and second teeth and the first arch member coupling and the second arch member coupling are connected to the anchor coupling of the first anchor and the anchor coupling of the second anchor respectively.

15. The appliance of any one of embodiments 1 to 14, wherein the anchor coupling of the first anchor comprises a post that extends from the base of the first anchor, and wherein the first arch member coupling comprises a slotted portion of the arch member body that is adapted to releasably engage the post of the first anchor.

16. The appliance of any one of embodiments 1 to 14, wherein the anchor coupling of the first anchor comprises a slot, and wherein the first arch member coupling comprises a resilient tab that is adapted to releasably engage the slot of the anchor coupling of the first anchor.

17. The appliance of any one of embodiments 1 to 16, wherein the anchor coupling of the first anchor is adapted to provide at least one of a selected torque, rotation, and angulation to the first tooth when the first arch member coupling is connected to the anchor coupling of the first anchor and the first anchor is connected to the first tooth.

18. The appliance of any one of embodiments 1 to 17, wherein the arch member comprises a tab adapted to engage at least one of the first and second anchors.

19. The appliance of any one of embodiments 1 to 18, wherein at least a portion of the arch member body is adapted to be attached directly to a surface of a tooth.

20. The appliance of any one of embodiments 1 to 19, wherein the arch member further comprises a coating disposed on at least a portion of the arch member body.

21. The appliance of any one of embodiments 1 to 20, wherein at least one of the first and second anchors comprises a second anchor coupling.

22. The appliance of any one of embodiments 1 to 21, wherein a portion of the arch member body comprises a hook.

23. The appliance of any one of embodiments 1 to 22, wherein a portion of the arch member body comprises a loop.

24. An orthodontic appliance comprising:
an arch member comprising an arch member body and a plurality of arch member couplings integral with the body; and a plurality of anchors each comprising an anchor coupling and a base adapted to connect the anchor to a surface of a tooth; wherein each arch member coupling is releasably connectable to the anchor coupling of an anchor of the plurality of anchors; wherein a first portion of the arch member body is adapted to provide a first corrective force and a second portion of the arch member body is adapted to provide a second corrective force different from the first corrective force, and further wherein the arch member body is adapted to not contact the surface of the tooth when the anchor of the plurality of anchors is connected to the surface of the tooth.

25. The appliance of embodiment 24, wherein the arch member comprises a self-ligating arch member.

26. The appliance of any one of embodiments 24 to 25, wherein at least one anchor of the plurality of anchors is adapted for displacement relative to the arch member body when the at least one anchor is connected to a tooth and an arch member coupling of the plurality of arch member couplings is releasably connected to the anchor coupling of the at least one anchor.

27. The appliance of any one of embodiments 24 to 26, wherein the arch member further comprises a coating disposed on at least a portion of the arch member body.

28. The appliance of any one of embodiments 24 to 27, wherein the first portion of the arch member body comprises a first cross-sectional geometry and the second portion of the arch member body comprises a second cross-sectional geometry different from the first cross-sectional geometry.

29. The appliance of embodiment 28, wherein at least one of the first cross-sectional geometry and the second cross-sectional geometry comprises a twisted portion.

30. The appliance of embodiment 28, wherein at least one of the first cross-sectional geometry and the second cross-sectional geometry comprises a stepped portion.

31. The appliance of any one of embodiments 24 to 30, wherein at least a portion of the arch member body is adapted to be attached directly to a surface of a tooth.

32. A method of forming an arch member comprising an arch member body and an arch member coupling integral with the body, comprising:
providing a substrate comprising a resilient material; and
removing a portion of the substrate to form the arch member.

33. The method of embodiment 32, wherein removing the portion of the substrate comprises laser cutting the substrate to form the arch member.

34. The method of embodiment 32, wherein removing the portion of the substrate comprises etching the substrate to form the arch member.

35. The method of any one of embodiments 32 to 34, further comprising removing a portion of the arch member body to provide a thickness of the body that varies along a length of the body.

36. The method of any one of embodiments 32 to 35, further comprising forming a portion of the arch member body into a selected shape.

37. The method of embodiment 36, wherein forming the portion of the arch member body into the selected shape comprises bending the portion of the arch member body into the selected shape.

38. The method of embodiment 36, wherein forming the portion of the arch member body into the selected shape comprises machining the portion of the arch member body into the selected shape.

39. The method of embodiment 36, wherein the selected shape comprises a hook.

40. The method of embodiment 36, wherein the selected shape comprises a twist.

41. The method of embodiment 36, wherein the selected shaped comprises a step.

42. The method of any one of embodiments 32 to 41, further comprising heat-setting the arch member body.

43. A method of specifying an orthodontic appliance comprising:
providing a proposed specification of the orthodontic appliance, wherein the orthodontic appliance comprises an arch member comprising an arch member body and an arch member coupling integral with the body, and a set of anchors, each anchor comprising an anchor coupling and a base adapted to connect the anchor to a surface of a tooth, wherein each arch member coupling is releasably connectable to an anchor coupling, and wherein the arch member body comprises a cross-sectional geometry that varies along a length of the body;
providing a first digital image representing a first dental arrangement associated with the orthodontic appliance;
deriving a target digital image representing a target dental arrangement;
revising the proposed specification of the orthodontic appliance based in part on the target digital image; and
forming the orthodontic appliance based on the revised proposed specification.

44. The method of embodiment 43, wherein the arch member comprises a self-ligating arch member.

45. An orthodontic treatment system comprising an orthodontic appliance, wherein the orthodontic appliance comprises: a set of arch members, each arch member comprising an arch member body and an arch member coupling integral with the body, at least one arch member of the set of arch members comprises an arch member body comprising a cross-sectional geometry that varies along a length of the body; a set of anchors adapted to connect to respective teeth of a patient's dental arch, each anchor comprising an anchor coupling and a base adapted to connect the anchor to a surface of a tooth; wherein the arch member coupling is releasably connectable to an anchor coupling of an anchor of the set of anchors; wherein a first arch member of the set of arch members has a first cross-sectional geometry adapted to move at least one tooth from a first arrangement to a second arrangement, and a second arch member of the set of arch members has a second cross-sectional geometry adapted to move at least one tooth from the second arrangement to a third arrangement.

46. The system of embodiment 45, wherein at least one arch member of the set of arch members comprises a self-ligating arch member.

47. The system of any one of embodiments 45 to 46, wherein at least one anchor of the set of anchors is adapted for displacement relative to at least one arch member of the set of arch members.

48. The system of any one of embodiments 45 to 47, wherein at least one arch member of the set of arch members comprises a portion that is adapted to be attached directly to a surface of a tooth.

49. The system of any one of embodiments 45 all to 48, wherein at least one arch member of the set of arch members comprises a coating disposed on at least a portion of the arch member body.

50. The system of any one of embodiments 45 to 49, further comprising a palatal expander that is adapted to be connected to an arch member of the set of arch members.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. A method of specifying an orthodontic appliance comprising:
    providing a proposed specification of the orthodontic appliance, wherein the orthodontic appliance comprises an arch member comprising an arch member body and an arch member coupling integral with the body, and a set of anchors, each anchor comprising an anchor coupling and a base adapted to connect the anchor to a surface of a tooth, wherein each arch member coupling is releasably connectable to the anchor coupling, and wherein the arch member body comprises a cross-sectional geometry that varies along a length of the body;
    providing a first digital image representing a first dental arrangement associated with the orthodontic appliance;
    deriving a target digital image representing a target dental arrangement;
    revising the proposed specification of the orthodontic appliance based in part on the target digital image; and
    forming the orthodontic appliance based on the revised proposed specification, wherein forming the orthodontic appliance comprises forming the arch member body and an arch member coupling integral with the arch member body by removing a portion of a sheet of material to form the arch member body and the arch member coupling.

2. The method of claim 1, wherein the arch member comprises a self-ligating arch member.

3. The method of claim 1, further comprising removing a portion of the arch member body to provide a thickness of the body that varies along a length of the body.

4. The method of claim 1, further comprising forming a portion of the arch member body into a selected shape.

5. The method of claim 4, wherein the selected shape comprises at least one of a hook, a twist, and a step.

6. The method of claim 1, further comprising heat-setting the arch member body.

7. The method of claim 1, wherein removing a portion of the sheet of material comprises cutting, stamping, or etching a flat section of the sheet of material.

8. The method of claim 1, wherein the sheet of material comprises at least one of nitinol, stainless steel, nickel titanium, or beta titanium.

9. The method of claim 1, wherein the sheet of material is a single sheet of material.

10. The method of claim 1, wherein the arch member body and the arch member coupling are integrally formed.

* * * * *